(12) United States Patent
Makin, III et al.

(10) Patent No.: US 12,491,457 B2
(45) Date of Patent: Dec. 9, 2025

(54) QUANTITATIVE DISORDER ANALYSIS AND PARTICLE REMOVAL EFFICIENCY OF FIBER-BASED FILTER MEDIA

(71) Applicant: THE BOARD OF TRUSTEES OF WESTERN MICHIGAN UNIVERSITY, Kalamazoo, MI (US)

(72) Inventors: Robert Allen Makin, III, Kalamazoo, MI (US); Steven Michael Durbin, Kalamazoo, MI (US)

( * ) Notice: Subject to any disclaimer, the term of this patent is extended or adjusted under 35 U.S.C. 154(b) by 0 days.

(21) Appl. No.: 17/735,788

(22) Filed: May 3, 2022

(65) Prior Publication Data
US 2022/0347610 A1 Nov. 3, 2022

Related U.S. Application Data

(60) Provisional application No. 63/219,192, filed on Jul. 7, 2021, provisional application No. 63/183,192, filed on May 3, 2021.

(51) Int. Cl.
*B01D 39/00* (2006.01)
*B01D 39/16* (2006.01)

(52) U.S. Cl.
CPC .. *B01D 39/1623* (2013.01); *B01D 2239/0618* (2013.01); *B01D 2239/10* (2013.01); *B01D 2273/18* (2013.01); *B01D 2279/50* (2013.01)

(58) Field of Classification Search
CPC ............ B01D 2279/50; B01D 2273/18; B01D 2239/0618; B01D 2239/10; B01D 39/1623; B01D 2239/0233; B01D 2239/0627; B01D 2239/0631; B01D 2239/065

USPC .......................................................... 55/528
See application file for complete search history.

(56) References Cited

U.S. PATENT DOCUMENTS

| | | | |
|---|---|---|---|
| 3,309,553 | A | 3/1967 | Kroemer |
| 3,413,533 | A | 11/1968 | Kroemer et al. |
| 4,792,832 | A | 12/1988 | Baba et al. |
| 4,833,101 | A | 5/1989 | Fujii |
| 7,951,494 | B2 | 5/2011 | Sawa et al. |

(Continued)

FOREIGN PATENT DOCUMENTS

| | | |
|---|---|---|
| CN | 111260645 A | 6/2020 |
| CN | 113435292 A | 9/2021 |

(Continued)

OTHER PUBLICATIONS

Hiejima et al., Investigation of Molecular Mechanisms of Melting and Crystallization of Isotactic Polypropylene by in Situ Raman Spectroscopy, Macromolecules, vol. 50, 2017, pp. 5867-5876. (Year: 2017).*

(Continued)

*Primary Examiner* — T. Bennett McKenzie
(74) *Attorney, Agent, or Firm* — David J Johnson

(57) ABSTRACT

A process for predicting and adjusting particle removal efficiency of fiber-based filter media based on quantification of disorder. An order parameter may be extracted through Raman spectroscopy or scanning electron microscopy. Production processes may be adjusted to change (e.g., increase) the particle removal efficiency of fiber-based filter media utilizing a predefined correlation between order parameter and particle removal efficiency. The filter media may be utilized in masks, filters, and other applications.

15 Claims, 14 Drawing Sheets

(56) References Cited

U.S. PATENT DOCUMENTS

| | | |
|---|---|---|
| 8,981,382 B2 | 3/2015 | Gao |
| 9,622,698 B2 | 4/2017 | Mestha et al. |
| 9,864,903 B2 | 1/2018 | Cheswick |
| 9,876,248 B2 | 1/2018 | Hiraiwa et al. |
| 10,381,673 B2 | 8/2019 | Tsutsumi et al. |
| 10,446,189 B2 | 10/2019 | Zukerman et al. |
| 10,810,725 B1 | 10/2020 | Dolhansky et al. |
| 11,545,563 B2 | 1/2023 | Makin, III et al. |
| 2013/0240026 A1 | 9/2013 | Atwater et al. |
| 2015/0213305 A1 | 7/2015 | Sundstrom |
| 2015/0368632 A1* | 12/2015 | Lukehart ............... C12N 13/00  435/325 |
| 2016/0140405 A1 | 5/2016 | Graumann et al. |
| 2017/0172487 A1 | 6/2017 | Aharon |
| 2018/0083155 A1 | 3/2018 | Mahajan et al. |
| 2018/0122969 A1 | 5/2018 | Olenick et al. |
| 2018/0361287 A1* | 12/2018 | Zhang ..................... B01D 39/18 |
| 2019/0168144 A1* | 6/2019 | Umebayashi .......... D04H 1/435 |
| 2020/0227751 A1 | 7/2020 | Mimura et al. |
| 2020/0334347 A1 | 10/2020 | Hoyos et al. |
| 2021/0036310 A1 | 2/2021 | Hou et al. |
| 2021/0117690 A1 | 4/2021 | Ye et al. |
| 2021/0119237 A1 | 4/2021 | Lee et al. |
| 2021/0202988 A1 | 7/2021 | Kim et al. |
| 2021/0349093 A1 | 11/2021 | Makin, III et al. |
| 2021/0359324 A1 | 11/2021 | Armstrong |
| 2022/0121884 A1 | 4/2022 | Zadeh et al. |
| 2022/0347610 A1 | 11/2022 | Makin, III et al. |
| 2022/0365243 A1 | 11/2022 | Makin, III et al. |
| 2023/0000426 A1 | 1/2023 | Makin, III et al. |

FOREIGN PATENT DOCUMENTS

| | | |
|---|---|---|
| EP | 3629232 A1 | 4/2020 |
| JP | 6191368 B2 | 9/2017 |
| WO | 2014072375 A1 | 5/2014 |
| WO | 2021137946 A1 | 7/2021 |
| WO | PCT/US23/24135 | 6/2023 |
| WO | PCT/US23/24243 | 6/2023 |

OTHER PUBLICATIONS

Bragg, W. L. et al., "The effect of thermal agitation on atomic arrangement in alloys," Proceedings of the Royal Society of London, Series A, Containing Papers of a Mathematical and Physical Character, vol. 145, pp. 699-730, 1934.

Bragg W. L. et al., "The effect of thermal agitation on atomic arrangement in alloys—II," Proceedings of the Royal Society of London, Series A, Mathematical and Physical Sciences, vol. 151, pp. 540-566, Oct. 1, 1935, <https://doi.org/10.1098/rspa.1935.0165>.

Bragg, W. L., "The effect of thermal agitation on atomic arrangement in alloys—III," Proceedings of the Royal Society of London, Series A, Mathematical and Physical Sciences, vol. 152, Oct. 15, 1935, pp. 231-252.

Warren, B. E., "X-Ray Diffraction," Dover Publications, 2012.

Makin, R.A., York, K., Durbin, S.M., Senabulya, N., Mathis, J., Clarke, R., Feldberg, N., Miska, P., Jones, C.M., Deng, Z., Williams, L., Kioupakis, E., Reeves, R.J., "Alloy-Free Band Gap Tuning across the Visible Spectrum," Phys. Rev. Lett. 122, 256403, 2019.

Makin, Robert A., III, "Structural Motifs, Disorder, and the Efficacy of Viral Vaccines," Department of Electrical and Computer Engineering, Western Michigan University, Kalamazoo, MI, doi: https://doi.org/10, 1101, Jun. 8, 2020, 139907.

Makin, R. A. et al., "Revisiting semiconductor band gaps through structural motifs: An Ising model perspective," Phys. Rev. B 102, 115202—Published Sep. 8, 2020.

Loveluck, J. et al., "Theory of the optical properties of phonon systems with disordered force constants, with application to NH4CI," J. Phys. Chem. Solids 34, 869 (1973).

Hiejima, Y. et al., "Investigation of the Molecular Mechanisms of Melting and Crystallization of Isotactic Polypropylene by in Situ Raman Spectroscopy," Macromolecules, vol. 50, 2017, pp. 5867-5876.

Lee, S. et al., "Reusable Polybenzimidazole Nanofiber Membrane Filter for Highly Breathable PM2.5 Dust Proof Mask", ACS Applied Materials & Interfaces 11, Jan. 7, 2019, pp. 2750-2757.

Principles of Equilibrium Statistical Mechanics, John Wiley & Sons, Ltd., 2005, Chapter 12—Mean-Field Theory III: Landau Formulation, pp. 432-469.

Hikosaka, M. et al., "The order of the molecular chains in isotactic polypropylene crystals," Polymer Journal, vol. 5, 1973, pp. 111-127.

Auriemma, F. et al., "Structural Disorder in the a Form of Isotactic Polypropylene," Macromolecules 33, 8764 Oct. 1, 2000.

De Rosa, C. et al., "A polymorphism in polymers: A tool to tailor material's properties," Polymer Crystallization, 2020, 3: e10101.

Lany, S. et al., "Monte Carlo simulations of disorder in ZnSnN2 and the effects on the electronic structure," Phys. Rev. Materials, vol. 1, 035401 Aug. 2017.

H. Li, W. Wu, M. M. Bubakir, H. Chen, X. Zhong, Z. Liu, Y. Ding, and W. Yang, J., "Polypropylene fibers fabricated via a needleless melt-electrospinning device for marine oil-spill cleanup," Appl. Polymer Science, vol. 131, 2014.

G. Allegra, P. Corradini and P. Ganis, "A model of the chain conformation of an isotactic vinyl polymer having optically active side groups," Macromolecular Chemistry and Physics, vol. 90, 1966, pp. 60-65.

T.M. Birshtein and P.M. Luisi, "Conformation of optically active isotactic macromolecules," Vysokomol. Soedin. Polymer Science, vol. 6, 1238 (1964).

Ho, R.-M. et al., "Helical architectures from self-assembly of chiral polymers and block copolymers," Progress in Polymer Science, vol. 36, 2011, pp. 376-453.

R. Ishidate, A. J. Markvoort, K. Maeda, and E. Yashima, "Unexpectedly Strong Chiral Amplification of Chiral/Achiral and Chiral/Chiral Copolymers of Biphenylylacetylenes and Further Enhancement/Inversion and Memory of the Macromolecular Helicity," J. Am. Chem. Soc. 141, 2019, pp. 7605-7614.

Laks, D. B. et al., "Evolution of alloy properties with long-range order," Phys. Rev. Lett., vol. 69, 1992, pp. 3766-3770.

Wei, S. et al., "Dependence of the optical properties of semiconductor alloys on the degree of long-range order," Appl. Phys. Lett., vol. 62, pp. 1937-1939 (1993).

Liu, J. et al., "Low resistance bicomponent spunbond materials for fresh air filtration with ultra-high dust holding capacity," RSC Advances 7, 2017, pp. 43879-43887.

Agranovski, I. E. et al., "Enhancement of the performance of low-efficiency HVAC filters due to continuous unipolar ion emission," Aerosol Science and Technology 40, 2006, pp. 963-968.

Makin, R. A. et al., "Quantitative Disorder Analysis and Particle Removal Efficiency of Polypropylene-Based Masks," Dept. of Computer Eng., Western Michigan University, Kalamazoo, MI, Dec. 1, 2020, pp. 3853-2861, DOI: 10.1557/adv.2020.346.

Gamon, J., Dyer, M. S., Duff, B. B., Vasylenko, A., Daniels, L. M., Zanella, M., Gaultois, M. W., Blanc, F., Claridge, J. B., Rosseinsky, M. J. (2021). Li4.3als3.3cl0.7: A sulfide-chloride lithium ion conductor with highly disordered structure and increased conductivity. Chemistry of Materials, 33(22), 8733-8744. https://doi.org/10.1021/acs.chemmater.1c02751.

Garcia-Barriocanal, J., Rivera-Calzada, A., Varela, M., Sefrioui, Z., Díaz-Guillén, M.R., Moreno, K.J., Díaz-Guillén, J. A., Iborra, E., Fuentes, A.F., Pennycook, S.J., Leon, C. and Santamaria, J. (2009), Tailoring Disorder and Dimensionality: Strategies for Improved Solid Oxide Fuel Cell Electrolytes. ChemPhysChem, 10: 1003-1011. https://doi.org/10.1002/cphc.200800691.

Hattori et al., "Change in Conductivity of Yttria Stabilized Zirconia," Journal of the Japan Society of Powder and Powder Metallurgy, vol. 50, No. 4, pp. 297-301, 2003.

Hu, N., Khan, M., Wang, Y., Song, X., Lin, C., Chang, C., Zeng, Y. (2017). Effect of microstructure on the thermal conductivity of plasma sprayed Y2O3 stabilized zirconia (8% YSZ). Coatings, 7(11), 198. https://doi.org/10.3390/coatings7110198.

(56) References Cited

OTHER PUBLICATIONS

I. R. Gibson, G. P. Dransfield, and J. T. S. Irvine, "Sinterability of commercial 8 mol% yttriastabilized zirconia powders and the effect of sintered density on the ionic conductivity," Journal of Materials Science, vol. 33, No. 17, pp. 4297-4305, Sep. 1998.
ISR for PCT/US23/24243 dated Sep. 8, 2023.
O. H. Kwon et al., "Investigation of the electrical conductivity of sintered monoclinic zirconia (ZrO2)," Ceramics International, vol. 43, No. 11, pp. 8236-8245, Aug. 2017.
Tu, Z., Tian, Y., Liu, M., Jin, B., Akbar, M., Mushtaq, N., Wang, X., Dong, W., Wang, B., Xia, C. (2021). Remarkable onic conductivity in a LZO-SDC composite for low-temperature solid oxide fuel cells. Nanomaterials, 11 (9), 2277. https://doi.org/10.3390/nano11092277.
Wohlmuth, D., Epp, V., Bottke, P., Hanzu, I., Bitschnau, B., Letofsky-Papst, I., Kriechbaum, M., Amenitsch, H., Hofer, F., Wilkening, M. (2014). Order vs. disorder—a huge increase in ionic conductivity of nanocrystalline LiAlO_2 embedded in an amorphous-like matrix of lithium aluminate. J. Mater. Chem. A, 2(47), 20295-20306. https://doi.org/10.1039/c4ta02923b.
Y.-Z. Xing, C.-J. Li, Q. Zhang, C.-X. Li, and G.-J. Yang, "Influence of Microstructure on the Ionic Conductivity of Plasma-Sprayed Yttria-Stabilized Zirconia Deposits," Journal of the American Ceramic Society, vol. 91, No. 12, pp. 3931-3936, 2008.
Morgan, RS., "Reciprocal ribose interactions: A possible structural motif in and between RNA'S," Biosystems, vol. 5, 1973, pp. 95-97.
Meher, S.R., Biju, K.P., and Jain, M.K., "Raman spectroscopic investigation of phase separation and compositional fluctuations in nanocrystalline InGa1xN thin films prepared by modified activated reactive evaporation," Physica Status Solidi (a) 208, 2655 (2011).
Perez, J.M., Villalobos, J., Mcneill, P., Prasad, J., Cheek, R., Kelber, J., Estrera, J.P., Stevens, P. D., and Glosser, R., "Direct evidence for the amorphous silicon phase in visible photoluminescent porous silicon," Applied Physics Letters 61,563 (1992).
Potts, R.B., "Some generalized order-disorder transformations," Mathematical Proceedings of the Cambridge Philosophical Society 48, 106 (1952).
Prokes, S.M. and Glembocki, O.J., "Role of interfacial oxide-related defects in the red-light emission in porous silicon," Phys. Rev. B 49, 2238 (1994).
Robins, L., Paul, A., Parker, C., Roberts, J., Bedair, S., Piner., E., and El-Masry, N., "Optical Absorption Raman, and Photoluminescence Excitation Spectroscopy of Inhomogeneous InGaN Films," MRS Proceedings 537, 33.22 (1998).
Senthilkumar, V., Venkatachalam, S., Viswanathan, C., Gopal, S., Narayandass, S.K., Mangalaraj, D., Wilson, K.C., and Vijayakumar, K.P., "Influence of substrate temperature on the properties of ,vacuum evaporated InSb films," Crystal Research and Technology 40, 573 (2005).
Sokolov, A.P., Shebanin, A.P., Golikova, O.A., and Mezdrogina, M.M., "Structural disorder and optical gap fluctuations in amorphous silicon," Journal of Physics: Condensed Matter 3, 9887 (1991).
Sood, A.K., Jayaram, K., and Muthu, D.V.S., "Raman and high-pressure photoluminescence studies on porous silicon," Journal of Applied Physics 72, 4963 (1992).
Tanino, H., Kuprin, A., Deai, H., and Koshida, N., "Raman study of free-standing porous silicon," Phys. Rev. B 63, 1937 (1996).
Tsu, R., Shen, H., and Dutta, M., "Correlation of Raman and photoluminescence spectra of porous silicon," Applied Physics Letters 60, 112 (1992).
Ising E:, "Beitrag zur Theorie des Ferromagnetismus," Zeitschrift fOr Physik 32 (1924), 6 pages.
European Commission, DG Enterprise and Industry, "Critical raw materials for the EU Report of the Ad-hoc Working Group on defining critical raw materials", European Commission, Jul. 30, 2010, 84 pages.
Fateley et al., "Practical Methods for Selection Rules" (pp. 1-42 of this book originally appeared as "Infrared and Raman Selection Rules for Molecular and Lattice Vibrations: The Correlation Method," Wiley-Interscience, New York (1972), 33 pages.
Ichimiya, A. and Cohen, P., "Kinematic Electron Diffraction," Cambridge University Press, Cambridge, England, 2004, 23 pages.
Ising et al., "The Fate of Ernst Ising and the Fate of his Model," Jun. 6, 2017, 46 pages.
Kochmanski, Martin S. Note on the E. Ising's Paper, Bitrag Zur Theorie Des Ferromagnetismus, Feb. 13, 2008, 4 pages.
Makin et al., "Supplementary Information for Alloy-Free Band Gap Tuning Across the Visible Spectrum," at least as early as Jun. 27, 2019, 6 pages.
Wikipedia, "Ising model," Last edited on Apr. 4, 2022, 29 pages.
Zhao, Q., Potter, C.S., Carragher, B., Lander, G., Sworen, J., Towne, V. et al., "Characterization of virus-like particles in Gardasil by cryo transmission electron microscopy," Human Vaccines & Immunotherapeutics, Mar. 2014, 10(3), pp. 734-739.
Boigard, H., Alimova, A., Martin, G.R, Katz, A., Gottlieb, P., Galarza, J.M., "Zika virus-like particle (VLP) based vaccine," PLOS Negl. Trop. Dis., May 2017, 11(5):e0005608.
Bonnez, W. et al., "Isolation and propagation of human papillomavirus type 16 in human xenografts implanted in the severe combined immunodeficiency mouse," J_ Virol., 72, pp. 5256-5261, 1998.
Carter, C.B. and Williams, D.B. (Eds.), "Transmission Electron Microscopy: Diffraction, Imaging, and Spectrometry," Springer International Publishing, 2016, Available from: https://www_springer.com/gp/book/9783319266497.
CDC, "H1N1 Flu," Images of the H1N1 Influenza Virus, at least as early as May 6, 2019, Available from: https://www.cdc.gov/h1n1flu/images_htm?s_cid=cs_001.
Chan, W., Zhou, H., Kemble, G., Jin, H., "The cold adapted and temperature sensitive influenza A/Ann Arbor/6/60 virus, the master donor virus for live attenuated influenza vaccines, has multiple defects in replication at the restrictive temperature," Virology, Oct. 25, 2008, vol. 380(2), pp. 304-311.
Chua, K., Mee Hoo Wong, E., Cropp, B., Hyatt, A., "Role of electron microscopy in Nipah virus outbreak investigation iind control," The Medical Journal of Malaysia, Jun. 2, 2007, vol. 62, pp. 139-142.
Cohen, K. W. and Frahm, N., "Current views on the potential for development of a HIV vaccine," Expert Opinion Biological Therapy, 17:3, pp. 295-303, 2017.
Cullity, B.D., "Elements of x-ray diffraction," Addison-Wesley Publishing Company, Inc., 1978.
Cunha, A.J.L.A. da, de Magalhaes-Barbosa, M.C., Lima-Setta, F., Medronho, R. de A., Prata-Barbosa, A., "Microcephaly Case Fatality Rate Associated with Zika Virus Infection in Brazil: Current Estimates," Pediatr. Infect. Dis. U., 2017, vol. 36(5), pp. 528-530.
Eckert, A., Higgins, D., MAMS, CDC, "Illustration of a Coronavirus," Public Health Image Library, 2020, Available from: https://phil.cdc.gov/details .aspx?pid=23312.
Fibriansah, G., Ng, T-S., Kostyuchenko, V.A., Lee, J., Lee, S., Wang, J. et al., "Structural Changes in Dengue Virus When Exposed to a Temperature of 37° C.," Journal of Virology, Jul. 2013, vol. 87(13), pp. 7585-7592.
Gels, T., Schagger, H. and von Jagow, G., "Tricine-sodium dodecyl sulfate-polyacrylamide gel electrophoresis for the separation of proteins in the range from 1 to 100 kDa," Anal. Biochem., vol. 166, pp. 368-379, 1987.
Hierholzer, J.C. and Kabara, J. J., "In Vitro Effects of Monolaurin Compounds on Enveloped RNA and DNA Viruses," Journal of Food Safety, vol. 4, pp. 1-12, 1982.
Hyatt, A.D., Zaki, S.R., Goldsmith, C.S., Wise, T.G., Hengstberger, S.G., "Ultrastructure of Hendra virus and Nipah virus within cultured cells and host animals," Microbes and Infection, Apr. 2001, 1 ;3(4), pp. 297-306.
Jordan, D., CDC, "3D rendering of a whole influenza (flu) virus," Public Health Image Library, 2019, Available from: https://phil.cdc.gov/Details.aspx?pid=23227.
Kenmoe, S., Demanou, M., Bigna, J.J., Nde Kengne, C., Fatawou Modiyinji, A., Simo, F.B.N. et al., "Case fatality rate and risk factors for Nipah virus encephalitis: A systematic review and meta-analysis," J. Clin. Virol., 2019, vol. 117, pp. 19-26.
Landau, L.D., "On the Theory of Phase Transitions," Zh. Esksp. Teor. Fiz. 7, pp. 19-32, 1937.

(56) References Cited

OTHER PUBLICATIONS

Monaghan, P., Green, D., Pallister, J., Klein, R., White, J., Williams, C. et al., "Detailed morphological characterisation of Hendra virus infection of different cell types using super-resolution and conventional imaging," Virology Journal, Nov. 27, 2014, 11:200, pp. 1-12.
Monath, T.P., "Treatment of yellow fever," Antiviral Research, vol. 78, pp. 116-124, 2008.
National Center for Emerging and Zoonotic Infectious Diseases, "Hendra Virus Disease (HeV)," Feb. 2021, Available from: https://www.cdc.gov/vhf/hendra/pdf/factsheet.pdf.
NIAID, "1918 H1N1 Virus Particles," 2018, Available from: https://www.flickr.com/photos/niaid/30012820867/.
NIAID, "Zika Virus," 2016, Available from: https://www.flickr.com/photos/niaid/27023892862/.
Nickol, M.E. and Kindrachuk, J., "A year of terror and a century of reflection: perspectives on the great influenza pandemic of 1918-1919," BMC Infectious Diseases, Feb. 6, 2019, vol. 19:117, 10 pages.
Pankrac, J., Klein, K., McLay, P.F., King, D.F.L., Bain, K., Knapp, J. et al., "A heterogeneous human immunodeficiency virus-like particle (VLP) formulation produced by a novel vector system," NPJ Vaccines, Jan. 19, 2018, 3(1), pp. 1-10.
Rerks-Ngarm, S., Pitisuttithum, P., Nitayaphan, S., Kaewkungwal, J., Chiu, J., Paris, R. et al., "Vaccination with ALVAC and AIDSVAX to prevent HIV-1 infection in Thailand," The New England Journal of Medicine, Dec. 3, 2009, vol. 361 (23), pp. 2209-2220.
Salinas, J.D. and Steiner, M.L., "West Nile Virus: Practice Essentials," Pathophysiology, Epidemiology, Medscape, Apr. 2, 20203 [cited May 5, 2020], Available from: https://emedicine.medscape.com/article/312210-overview.
Schiller, J. and Chackerian, B., "Why HIV Virions Have Low Numbers of Envelope Spikes: Implications for Vaccine Development," PLOS Pathog [Internet], Aug. 7, 2014 [cited May 5, 2020), vol. 10(8), Available from: https://www.ncbi.nlm.nih.gov/pmc/articles/PMC4125284/.
Science Source, "H3N2, Hong Kong Flu Virus," TEM, at least as early as May 6, 2019, Available from: https://www.sciencesource.com/CS.aspx?VP3=SearchResult&ITEMID=SS2760545.
Science Source, "H5N1, Influenza A, Avian Flu Virus," TEM, at least as early as May 6, 2019, Available from: https://www.sciencesource.com/CS.aspx?VP3=SearchResult&VBID=20PESQLF1 KBWQ&SM LS= 1 &RW=1920&RH=966#/.
Science Source, "HIV-1, Human Immunodeficiency Virus," TEM, at least as early as May 6, 2019, Available from: https://www.sciencesource.com/archive/HIV-1--Human-Immunodeficiency-Virus-TEM-SS2760525.html.
Science Source, "West Nile Virus," TEM, at least as early as May 6, 2019, Available from: https://www.sciencesource.com/archive/West-Nile-Virus-TEM-SS28384 79.html.
Smith, G.E., Sun, X., Bai, Y., Liu, Y.V., Massare, M.J., Pearce, M.B. et al., "Neuraminidase-based recombinant virus-like particles protect against lethal avian influenza A(H5N1) virus infection in ferrets," Virology, 2017, pp. 509:90-7.
Taubenberger, J.K. and Morens, D.M., "1918 Influenza: the Mother of All Pandemics," Emerging Infectious Diseases Journal—CDC, vol. 12, No. 1, Jan. 2006, pp. 15-22, Available from: https://wwwnc.cdc.gov/eid/article/12/1 /05-0979article.
TEM of HIV-antigen AIDS vaccine from yeast, Stock Image—G255/0040, Science Photo Library, at least as early as May 6, 2019, Available from: https://www.sciencephoto.com/media/211839/view/tem-of-hiv-antigen-aids-vaccine-from-yeast.
Thanh Hung, N. and Trong Lan, N., "Improvement of Case-Management—A Key Factor to Reduce Case-Fatality Rate of Dengue Haemorrhagic Fever in Southern Viet Nam," Dengue Bulletin, vol. 27, 2003 [cited May 5, 2020], pp. 144-148, Available from: https://apps.who.int/iris/handle/10665/163789.
WHO Department of Communicable Disease Surveillance and Response, "Consensus document on the epidemiology of severe acute respiratory syndrome (SARS)," WHO Dept of Communicable Disease Surveillance and Response, 2003, Available from: www.who.int/csr/sars/en/WHOconsensus.pdf.
WHO Director-General's opening remarks at the media briefing on COVID-19, Mar. 3, 2020, Available from: https://www.who.int/dg/speeches/detail/who-director-general-s-opening-remarks-at-the-media-briefing-on-covid-19.
WHO, "FAQs: H5N1 influenza," WHO, at least as early as May 6, 2019, Available from: https://www.who.int/influenza/human_animal_interface/avian_influenza/h5n1_research/faqs/en/.
WHO, "Middle East respiratory syndrome coronavirus (MERS-CoV)," WHO, Mar. 15, 2021, Available from: http://www.who.int/emergencies/mers-cov/en/.
Yellow Fever Virus, TEM—Stock Image—C036/7398, Science Photo Library, at least as early as May 6, 2019, Available from: https://www.sciencephoto.com/media/864658/view/yellow-fever-virus-tem.
Yu, I-M, Zhang, W., Holdaway, H.A., Li, L., Kostyuchenko, V.A., Chipman, P.R. et al., "Structure of the immature dengue virus at low pH primes proteolytic maturation," Science, Mar. 28, 2008, vol. 319(5871), pp. 1834-1837.
Zhang, X., Sheng, J., Plevka, P., Kuhn, R.J., Diamond, M.S., Rossmann, M.G., "Dengue structure differs at the temperatures of its human and mosquito hosts," Proc. Natl. Acad. Sci., Apr. 23, 2013, vol. 110(17), pp. 6795-6799.
Austin, I., Goodman, C., and Pengelly, A., "New Semiconductors with the Chalcopyrite Structure," J. Electrochem. Soc. 103, 609 (1956).
Chen, S., Narang, P., Atwater, H.A., and Wang, L., "Phase Stability and Defect Physics of a Ternary $ZnSnN_2$ Semiconductor: First Principles Insights," Adv. Mater. 26, 311 (2014).
Du, K., Bekele, C., Hayman, C.C., Angus, J.C., Pirouz, P. and Kash, K., "Synthesis and characterization of $ZnGeN_2$ grown from elemental Zn and Ge sources," J. Cryst. Growth 310, 1057 (2008).
Fioretti, A.N., Zakutayev, A., Moutinho, H., Melamed, C., Perkins, J.D., Norman, A.G., Al-Jassim, M., Toberer, E.S., iind Tamboli, A.G., "Combinatorial insights into doping control and transport properties of zinc tin nitride," J. Mater. Chem. C 3, 11017 (2015).
Goodman, C. and Douglas, R., "New semiconducting compounds of diamond type structure," Physica 20, 1107 (1954).
Goodman, C.H. L., "A New Group of Compounds with Diamond type (Chalcopyrite) Structure," Nature 179,828 (1957).
Heyd, J., Scuseria, G.E., and Emzerhof, M., "Hybrid functionals based on a screened Coulomb potential," J. Chem. Phys., vol. 118, pp. 8207-8215 (2003).
Iliopoulos, E., Adikimenakis, A., Dimakis, E., Tsagaraki, K., Konstantinidis, G., and Georgakilas, A., "Active nitrogen species dependence on radiofrequency plasma source operating parameters and their role in GaN growth," J. Cryst. Growth, 278, 426 (2005).
Jaffe, J. and Zunger, A., "Anion displacements and the band-gap anomaly in ternary $ABC_2$ chalcopyrite semiconductors," Phys. Rev. B, vol. 27, pp. 5176-5179 (1983).
Koblmuller, G., Gallinat, C., and Speck, J., "Surface kinetics and thermal instability of N-face InN grown by plasma-assisted molecular beam epitaxy," J. Appl. Phys. 101, 083516 (2007).
Lambrecht, W.R., Alldredge, E., and Kim, K., "Structure and phonons of $ZnGeN_2$," Phys. Rev. B 72, 155202 (2005).
Larson, W.L., Maruska, H.P., and Stevenson, DA, "Synthesis and Properties of $ZnGeN_2$," J. Electrochem. Soc., vol. 121, 1673 (1974).
Martinez, A.M., Arriaga, L.G., Fernandez, A.M., and Cano, U., "Band edges determination of $CuInS_2$ thin films prepared by electrodeposition," Mater. Chem. Phys., vol. 88, pp. 417 (2004).
Narang, P., Chen, S., Coronel, N.C., Gui, S., Yano, J., Wang, L., Lewis, N.S., and Atwater, H.A., "Bandgap Tunability in $Zn(Sn,Ge)N_2$ Semiconductor Alloys," Adv. Mater. 26, 1235 (2014).
Paudel, T.R. and Lambrecht, W.R., "First-principles calculation of the zone center phonons in $ZnSiN_2$: Comparison With infrared data," Phys. Rev. B 76, 115205 (2007).
Paudel, T.R. and Lambrecht, W.R., "First-principles calculations of elasticity, polarization-related properties, and nonlinear optical coefficients in Zn—IV—$N_2$ compounds," Phys. Rev. B, vol. 79, 245205 (2009).

(56) References Cited

OTHER PUBLICATIONS

Prabukanthan, P. and Dhanasekaran, R., "Growth of CuGaS2 Single Crystals by Chemical Vapor Transport and Characterization," Cryst. Growth Des. 7, 618 (2007).

Punya, A., Lambrecht, W.R., and van Schilfgaarde M., "Quasiparticle band structure of Zn—IV—N2 compounds," Phys. Rev. B 84, pp. 16520401-165204-10 (2011).

Qi, Y., Liu, Q., Tang, K., Liang, Z., Ren, Z., and Liu, X., "Synthesis and Characterization of Nanostructured Wurtzite CuInS2: A New Cation Disordered Polymorph of CuInS2," J. Phys. Chem. C 113, 3939 (2009).

Quayle, P.C., Blanton, E.W., Punya, A., Junno, G.T., He, K., Han, L., Zhao, H., Shan, J., Lambrecht, W.R.L., and Kash, K., "Charge-neutral disorder and polytypes in heterovalent wurtzite-based ternary semiconductors: The importance of the octet rule," Phys_ Rev. B 91, pp. 205207-01-20507-14 (2015).

Quayle, P.C., He, K., Shan, J. and Kash, K., "Synthesis, lattice structure, and band gap of ZnSnN2," MRS Commun. 3, 135 (2013).

Scanlon, O. and Walsh, A., "Bandgap engineering of ZnSnP2 for high-efficiency solar cells," Appl. Phys. Lett. 100, 251911 (2012).

Van de Walle, A., Tiwary, P., de Jong, M., Olmsted, D., Asta, M., Dick, A., Shin, D., Wang, Y., Chen, L.-Q., and Liu, Z.-K., "Efficient stochastic generation of special quasirandom structures," CALPHAD: Comput. Coupling Phase Diagrams Thermo-chem., vol. 42, pp. 13-18 (2013).

Veal, T.D., Feldberg, N., Quackenbush, N.F., Linhart, W.M., Scanlon, D.O., Piper, L.F., and Durbin, S.M., "Band Gap Dependence on Cation Disorder in ZnSnN2 Solar Absorber," Adv. Energy Mater. 5, 1501462 (2015).

Viennois, R., Taliercio, T., Potin, V., Errebbahi, A., Gil, B., Charar, S., Haidoux, A., and Tedenac, J.S., "Prospective Investigations of orthorhombic ZnGeN2: synthesis, lattice dynamics and optical properties," Mater. Sci. Eng. B 82, 45 (2001).

Wang, T., Ni, C., and Janotti, A., "Band alignment and p-type doping of ZnSnN2," Phys. Rev. B 95, pp. 205205-1-205205-6 (2017).

Zunger, A., Wei, S.-H., Ferreira, L.G., and Bernard, J.E., "Special quasirandom structures," Phys. Rev. Lett. 65, 353 (1990).

Berger, R.F., Fennie, C.J., and Neaton, J.B., "Band Gap and Edge Engineering via Ferroic Distortion and Anisotropic Strain: The Case of SrTiO3," Phys. Rev. Lett. 107, 146804 (2011).

Fioretti, A.N., Stokes, A., Young, M.R., Gorman, B., Toberer, E.S., Tamboli, A.C., and Zakutayev, A., "Effects of Hydrogen on Acceptor Activation in Ternary Nitride Semiconductors," Advanced Electronic Materials, vol. 3, 1600544 (2017).

Harding, C., Pompei, F., Bordonaro, S.F., McGillicuddy, D.C., Burmistrov, D., Sanchez, L.D., "The daily, weekly, and seasonal cycles of body temperature analyzed at large scale," Chronobiology International, Dec. 2, 2019, vol. 36(12), pp. 1646-1657.

Jaroenjittichai, A.P. and Lambrecht, W.R.L., "Electronic band structure of Mg—IV—N2 compounds in the quasiparticle-self-consistent GW approximation," Phys. Rev. B 94, 125201 (2016).

Kanchiang, K., Cheiwchanchamnangij, T., Laosiritawron, Y., Pramchu, S., and Jaroenjittichai, A.P., "Structural and electronic properites of MgGexSn(1-x)N2 semiconductors: The density functional theory investigation," Journal of Physics: Conference Series, 1144, 012149 (2018).

Kawamura, F., Yamada, N., Imai, M., and Taniguchi, T., "Synthesis of ZnSnN2 crystals via a high-pressure metathesis reaction," Cryst. Res_ & Technol., vol. 51,220 (2016).

Kresse, G, and Furthmuller, J., "Efficiency of ab-initio total energy calculations for metals and semiconductors using a plane-wave basis set," Comput. Mater. Sci. 6,15 (1996).

Kresse, G. and Furthmuller, J., "Efficient iterative schemes for ab initio total-energy calculations using a plane-wave basis set," Phys. Rev. B 54, 11169 (1996).

Kresse, G. and Hafner, J., "Ab initio molecular dynamics for liquid metals," Phys. Rev. B 47, 558 (1993).

Kresse, G. and Hafner, J., "Ab initio molecular dynamics simulation of the liquid-metal-amorphous-semiconductor transition in germanium," Phys. Rev. B 49, 14251 (1994).

Kresse, G. and Joubert, D., "From ultrasoft pseudopotentials to the projector augmented-wave method," Phys. Rev. B. f.101_ 59, 1758-1775 (1999).

Lahourcade, L., Coronel, N.C., Delaney, K.I., Shukla, S.K, Spaldin, N.A., and Atwater, H.A., "Structural and Optoelectronic Characterization of RF sputtered ZnSnN(2)," Advanced Materials, 25, 2562 (2013).

Lebens-Higgins, Z., Scanlon, D.O., Paik, H., Sallis, S., Nie, Y., Uchida, M., Quackenbush, N.F., Wahila, M.J., Sterbinsky, G.E., Arena, D.A., Woicik, J.C., Schlom, D.G., and Piper, L.F.J., "Direct Observation of Eletrostatically Driven Band Gap Renormalization in a Degenerate Perovskite Transparent Conducting Oxide," Phys. Rev. Lett. 116, 024602 (2016).

Lin, Yu-Jen et al., "A Rapid and Sensitive Early Diagnosis of Influenza Virus Subtype via Surface Enhanced Raman Scattering," Journal of Biosensors & Bioelectronics [Internet], 2014 [cited May 5, 2020], vol. 05(02), Available from: https://www.omicsonline.org/open-access/a-rapid-and-sensitive-early-diagnosis-of-influenza-virus-subtype-via-surface-enhanced-raman-scattering-2155-6210.1000150.php?aid=27090.

Liu, H., Li, Z., Cao, Y., Cui, Y., Yang, X., Meng Z. et al., "Effect of chondrocyte mitochondrial dysfunction on cartilage degeneration: A possible pathway for osteoarthritis pathology at the subcellular level," Molecular Medicine Reports, bet. 1, 2019, vol. 20(4), pp. 3308-3316.

Makin, R. A., Senabulya, N., Mathis, J., Feldberg, N., Miska, P., Clarke, R., and Durbin, S. M., "Growth of Ordered and Disordered ZnSnN2," J. Vac. Sci. Technol. B 35, 02B116 (2017).

Momma, K. and Izumi, F., "Vesta 3 for three-dimensional visualization of crystal, volumetric and morphology data," J. Appl. Crystallogr. 44, 1272 (2011).

NIAID, "MERS-CoV Particles," 2013, Available from: https://www.flickr.com/photos/niaid/8618697423/.

NIAID, "Novel Coronavirus SARS-CoV-2, 2020," Available from: https://www.flickr.com/photos/niaid/49641177636/.

Nussbaum-Krammer, C.I., Park, K-W, Li, L., Melki, R., Morimoto, RI., "Spreading of a Prion Domain from Cell-to-Cell Dy Vesicular Transport in Caenorhabditis elegans," PLOS Genetics, Mar. 28, 2013, vol. 9(3), e1003351.

Ober, J.A., "Mineral Commodity Summaries 2016," technical report, Reston, VA (2016).

Perdew, J.S., Burke, K., and Emzerhof, M., "Generalized Gradient Approximation Made Simple," Phys. Rev. Lett., vol. 77, pp. 3865-3868 (1996).

Peshek, T. J., Paudel, T. R., Kash, K., and Lambrecht, W.R.L., "Vibrational modes in ZnGeN2: Raman study and Theory," Phys. Rev. B 77, 235213 (2008).

Qin, R., Cao, H., Liang, L., Xie, Y., Zhuge, F., Zhang, H., Gao, J. Javaid, K., Liu, C., and Sun, W., "Semiconducting ZnSnN2 thin films for Si/ZnSnN2 p-n junctions," Appl. Phys, Lett., col. 108, 142104 (2016).

Quayle, P.T., Junno, G.T., He, K., Blanton, E.W., Shan, J., and Kash, K., "Vapor-liquid-solid synthesis of ZnSnN2," Phys. Status Solidi B, vol. 254, 1600718 (2017).

R. Jaffe, J. Price, M. Hitzman, and F. Slakey, "The Back Page, Energy Critical Elements," APS News, vol. 20, No. 4 (2011).

Reid, A.H., Taubenberger, J.K., Fanning, T.G., "The 1918 Spanish influenza: integrating history and biology," Microbes Infection, Jan. 2001, vol. 3(1), pp. 81-87.

Sarma, D.D., Shanthi, N., Barman, S.R., Hamada, N., Sawada, H., and Terakura, K., "Band Theory for Ground-State Properties and Exication Spectra of Perovskite LaMO3 ( M=Mn, Fe, Co, Ni)," Phys. Rev. Lett. 75, 1126 (1995).

Science Source, "SARS Coronavirus," TEM, at least as early as May 6, 2019, Available from: https://www.sciencesource.com/CS.aspx?VP3=SearchResult&ITEMID=SS2760539&POPUPPN= 1 &POPUPIID=2OPEBMGD5GLU.

Sebastian, M., Peters, J.A., Stoumpos, C.C., Im, J., Kostina, S.S., Liu, S., Kanatzidis, M.G., Freeman, A.J. and Wessels, B.B., "Exitonic

(56) References Cited

OTHER PUBLICATIONS emissions and above-band-gap luminescence in the single-crystal perovskite Semiconductors CsPbBr3 and CsPbCl3m," Phys. Rev. B 92, 235210 (2015).
Shen, T.Y., Mitra, S.S., Prask, H. and Trevino, S.F., "Order-disorder phenomenon in sodium nitrate studied by low-frequency Raman scattering," Phys. Rev. B 12, 4530 (1975).
Upton, M.H., Choi, Y., Park, H., Liu, J., Meyers, D., Chakhalian, J., Middey, S., Kim, J.-W., and Ryan, "Novel Electronic Behavior Driving NdNiO3 Metal-Insulator Transition," P.J., Phys. Rev. Lett, 115, 036401 (2015).
Vidal, J., Trani, F., Bruneval, F., Marques, M.A.L., and Botti, S., "Effects of Electronic and Lattice Polarization on the Band Structure of Delafossite Transparent Conductive Oxides," Phys, Rev. Lett. 104, 136401 (2010).
Wei, S.-H., Ferreira, L.B., and Zunger, A., "First-principles calculation of the order-disorder transition in chalcopyrite semiconductors," Phys. Rev. B, vol. 45, pp. 2533-2536 (1992).
Wilchinsky, Z. W., "X-Ray Measurement of Order in the Alloy Cu3Au," J. Appl. Phys. 15, 806 (1944).
Yan, X.-W., Gao, M., Lu, Z.-Y., and Xiang, T., "Electronic Structures and Magnetic Order of Ordered-Fe-Vacancy Ternary Iron Selenides TlFe1.5Se2 and AFe1.5Se2 (A=K, Rb, or Cs)," Phys. Rev, Lett, 106, 087005 (2011).
Calvo, F. et al., "Non-magnetic photospheric bright points in 3D simulations of the solar atmosphere," Astronomy & Astrophysics, vol. 596, id A43, Nov. 2016, 10 pages.
Zhao, Junwei et al., "Tracing p-Mode Waves From the Photosphere to the Corona in Active Regions," The Astrophysical Journal Letters, 830:L 17, Oct. 10, 2016, 7 pages.
Aghanim, N. et al, 2018 results—I. Overview and the cosmological legacy of Planck, Astronomy & Astrophysics 641, A1 (2020), publisher: EDP Sciences, 56 pages.
Aghanim, N.; "Planck 2018 results—VI. Cosmological parameters," Astronomy & Astrophysics 641, A6 (2020), publisher: EDP Sciences.
Grundy, W.M. et al, "Surface compositions across Pluto and Charon," Science 351, 10.1126/science.aad9189 (2016), publisher: American Association for the Advancement of Science.
Jarrett, T., "Large Scale Structure in the Local Universe," Tile 2MASS Galaxy Catalog, Publications of the Astronomical Society of Australia 21, 396 (2004), 6 pages.
R. A. et al, The sixteenth data release of the sloan digital sky surveys: First release from the apogee-2 southern survey and full release of eboss spectra (2019), 22 pages.
Ulrich, RK., "The Five-Minute Oscillations on the Solar Surface," The Astrophysical Journal 162,993 (1970).
Updated Recommendations for the Use of Typhoid Vaccine Advisory Committee on Immunization Practices, United States, 2015, 6 pages.
Zhang, H. et al., "Efficient Neural Network Robustness Certification with General Activation Functions," in Advances in Neural Information Processing Systems 31, edited by S. Bengio, H. Wallach, H. Larochelle, K. Grauman, N. Cesa-Bianchi, and R. Garnett (Curran Associates, Inc., 2018) pp. 4939-4948, 10 pages.
Ziethlow, V. et al., "Assessment by electron-microscopy of recombinant Vibrio cholerae and Salmoneila vaccine strains expressing enterotoxigenic *Escherichia coli*-specific surface antigens," Clinical Microbiology and Infection 14, 282 (2008), 5 pages.
A. Rössler, D. Cozzolino, L. Verdoliva, C. Riess, J. Thies, and M. Nießner, "FaceForensics++: Learning to Detect Manipulated Facial Images," 2019.
D. M. Montserrat et al., "Deepfakes Detection with Automatic Face Weighting," 2020 IEEE/CVF Conference on Computer Vision and Pattern Recognition Workshops (CVPRW), Seattle, WA, USA, 2020, pp. 2851-2859, doi: 10.1109/CVPRW50498.2020.00342.
ISR for PCT/US23/24135 dated Sep. 7, 2023.
K. Taya, N. Kuroki, N. Takeda, T. Hirose and M. Numa, "Detecting tampered regions in JPEG images via CNN," 2020 18th IEEE International New Circuits and Systems Conference (NEWCAS), Montreal, QC, Canada, 2020, pp. 202-205, doi: 10.1109/NEWCAS49341.2020.9159761.
Kohli, & Gupta, A. (2021). Detecting DeepFake, FaceSwap and Face2Face facial forgeries using frequency CNN. Multimedia Tools and Applications, 80(12), 18461-18478. https://doi.org/10.1007/s11042-020-10420-8.
Mazaheri, G., Roy-Chowdhury, A. K. (2022). Detection and localization of facial expression manipulations. 2022 IEEE/CVF Winter Conference on Applications of Computer Vision (WACV). https://doi.org/10.1109/https://doi.org/10.1109/wacv51458.2022.00283.
S. Agarwal, H. Farid, O. Fried and M. Agrawala, "Detecting Deep-Fake Videos from Phoneme-Viseme Mismatches," 2020 IEEE/CVF Conference on Computer Vision and Pattern Recognition Workshops (CVPRW), Seattle, WA, USA, 2020, pp. 2814-2822, doi: 10.1109/CVPRW50498.2020.00338.
Sun, Y., Zhang, Z., Qiu, C., Wang, L., Sun, L., Wang, Z. (2022). Faketransformer: Exposing face forgery from spatial-temporal representation modeled by facial pixel variations. 2022 7th International Conference on Intelligent Computing and Signal Processing (ICSP). https://doi.org/10.1109/icsp54964.2022.9778420.
Z. Zhang, C. Mal, B. Ding and M. Gao, "Detecting Manipulated Facial Videos: A Time Series Solution," 2020 25th International Conference on Pattern Recognition (ICPR), Milan, Italy, 2021, pp. 2817-2823, doi: 10.1109/ICPR48806.2021.9412610.
C. Ciszak et al., "Raman spectra analysis of ZrO2 thermally grown on Zircaloy substrates irradiated with heavy ion: Effects of oxygen isotopic substitution," Journal of Raman Spectroscopy, vol. 50, No. 3, pp. 425-435, 2019.
C. Zhang et al., "Ionic conductivity and its temperature dependence of atmospheric plasmasprayed yttria stabilized zirconia electrolyte," Materials Science and Engineering: B, vol. 137, No. 1, pp. 24-30, Feb. 2007.
Chen, X.J., et al. "Influence of microstructure on the ionic conductivity of yttria-stabilized zirconia electrolyte." Materials Science and Engineering A vol. 335 p. 246-252 [online]. Sep. 25, 2002 (Sep. 25, 2002) (retrieved on Aug. 2, 2023) Retrieved from the Internet: <URL: https://www.sciencedirect.com/science/article/abs/pii/S0921509301019359> <DOI: 10.1016/S0921-5093(01 )01935-9>.
D. Chen, S. Su, Z. Yu and L. Lu, "Geometrical Optimization of the Composite Cathode in a Solid Oxide Fuel Cell," 2011 Asia-Pacific Power and Energy Engineering Conference, Wuhan, China, 2011, pp. 1-4, doi: 10.1109/APPEEC.2011.5748908.
F. T. Ciacchi, K. M. Crane, and S. P. S. Badwal, "Evaluation of commercial zirconia powders forsolid oxide fuel cells," Solid State Ionics, vol. 73, No. 1, pp. 49-61, Oct. 1994.
Feng, X., Chien, P.-H., Wang, Y., Patel, S., Wang, P., Liu, H., Immediato-Scuotto, M., Hu, Y.-Y. (2020). Enhanced ion conduction by enforcing structural disorder in Li-deficient argyrodites li6-xps5-xcl1+x. Energy Storage Materials, 30, 67-73. https://doi.org/10.1016/j.ensm.2020.04.042.
Ma, J., Deng, H.-X., Luo, J.-W., and Wei, S.-H., "Origin of the failed ensemble average rule for the band gaps of disordered nonisovalent semiconductor alloys," Phys. Rev. B 90, 115201 (2014).
Nakatsuka, S. and Nose, Y., "Order-Disorder Phenomena and Their Effects on Bandgap in ZnSnP2," J. Phys. Chem. C 121, 1040 (2017).
Ryan, M., Peterson, M.W., Williamson, D., Frey, J.S., Maciel, G.E., and Parkinson, B., "Metal site disorder in zinc tin phosphide," J. Mater. Res. 2, 528 (1987).
St-Jean, P., Seryogin, G., and Francoeur, S., "Band gap of sphalerite and chalcopyrite phases of epitaxial ZnSnP 2 ZnSnP2," Appl. Phys. Lett. 96, 231913 (2010).
Cowley, J.M., "X-Ray Measurement of Order in Single Crystals of Cu3Au," J. Appl. Phys., vol. 21, 24 (1950).
Feldberg, N., Aldous, J., Linhart, W., Phillips, L., Durose, K., Stampe, P., Kennedy, R., Scanlon, D., Vardar, G., Field, R., III et al., "Growth, disorder, and physical properties of ZnSnN2," Appl. Phys. Lett. 103, 042109 (2013) doi: 10.1063/1.4816438.
Keating, D. T. and Warren, B. E., "Long-Range Order in Beta-Brass and Cu3Au," J. Appl. Phys. 22, 286 (1951).
Senabulya, N., Feldberg, N., Makin, RA., Yang, Y., Shi, G., Jones, C.M., Kioupakis, E., Mathis, J., Clarke, R., and Durbin, S.M.,

(56) References Cited

OTHER PUBLICATIONS

"Stabilization of orthorhombic phase in single-crystal ZnSnN2 films," AIP Adv. 6, 075019 (2016) doi: 10.1063/1.4960109.
Achiele, K.P., "Paul Klee's 'Rhythmisches': A Recapitulation of the Bauhaus Years," Zeitschrift fur Kunstgeschichte 57, 75 (1994).
Anderson, C., Zucker, F., and Steitz, T., "Space-filling models of kinase clefts and conformation changes," Science 204, 375 (1979).
Bhuiyan, A.G., Sugita, K., Kasashima, K., Hashimoto, A., Yamamoto, A., and Davydov, V.Y., "Single-crystalline InN films with an absorption edge between 0.7 and 2 eV grown using different techniques and evidence of the actual band gap energy," Applied Physics Letters, 83, 4788 (2003).
Bleckley, S. and Schroeder, S.J., "Incorporating global features of rna motifs in predictions for an ensemble of secondary structures for encapsidated ms2 bacteriophage rna," RNA 18, 1309 (2012).
Burstein, E., "Anomalous Optical Absorption Limit in InSb," Phys. Rev. 93, 632 (1954).
Cho, S.-H., "Effects of growth temperature on the properties of ZnO thin films grown by radio-frequency magnetron , sputtering," Transactions on Electrical and Electronic Materials 10, 185 (2009).
Cray, C. and Rowley, G., "Chinese and Western Composition: A Conversation between an Artist and an Art Historian," College Art Journal 15, 6 (1955).
Dimroth et al., "Wafer Bonded Four-junction GaInP/GaAs//GaInAsP/GaInAs Concentrator Solar Cells with 44.7% Efficiency," Progress in Pholovoltaics: Research and Applications, Prog. Pholovolt: Res. Appl. 2014, vol. 22, published Jan. 13, 2014, pp. 277-282, https://doi.org/10.1002/pip.2475.
Dixon, J.R., and Bis, R.F., "Band Inversion and the Electrical Properties of PbxSn1—xTe," Phys. Rev. 176, 942 (1968).
Feldberg et al., "ZnSnN2: A New Earth-Abundant Element Semiconductor for Solar Cells," Department of Physics, University at Buffalo, The State University of New York, Buffalo, NY, USA, IEEE, 2011 978-1-4673-0066-7/12, pp. J02524-002527 (4 pages).
Haddad, D.B., Thakur, U.S., Naik, V.M., Aun Er, G.W., Naik, R., and Wenger, L.E., "Optical Band Gap Measurements of InN Films in the Strong Degeneracy Limit," MRS Proceedings 743, L 11.22 (2002).
Holonyak, N. and Bevacqua, S.F., "Coherent (Visible) Light Emission From Ga(As1xPx) Junctions," Applied Physics Letters 1, 82 (1962).
Ichimiya, A., Cohen, P.I., and Cohen, P.I., "Reflection high-energy electron diffraction," Cambridge University Dress (2004).
Inushima, T., Mamutin, V., Vekshin, V., Ivanov, S., Sakon, T., Motokawa, M., and Ohoya, S., "Physical properties of InN with the band gap energy of 1.1ev," Journal of Crystal Growth 227-228, 481 (2001).
Janssen, B., Burgoyne, J.A., and Honing, H., "Predicting Variation of Folk Songs: A Corpus Analysis Study on the Memorability of Melodies," Frontiers in Psychology 8, 621 (2017).
Ji, X.H., Lau, S.P., Yang, HY., and Zhang, Q.Y., "Thin Solid Films" 515, 4619 (2007).
Kronig, R.D.L., Penney, W.G., and Fowler, R.H., "Quantum mechanics of electrons in crystal lattices," Proceedings of the Royal Society of London, Series A, Containing Papers of a Mathematical and Physical Character 130,499 (1931).
Kurimoto, E., Hangyo, M., Harisma, H., Yoshimoto, M., Yamaguchi, T., Araki, T., Nanishi, Y., and Kisoda, K., "Spectroscopic observation of oxidation process in InN," Applied Physics Letters 84, 212 (2004).
Lacklison, D.E., Orton, J.W., Harrison, I., Cheng, T.S., Jenkins, L.C., Foxon, C.T., and Hooper, S.E., "Band gap of GaN films grown by molecular-beam epitaxy on GaAs and GaP subsrtates," Journal of Applied Physics 78, 1838 (1995).
Makin et al., "Order Parameter and Band Gap of ZnSnN2," Department of Electrical and Computer Engineering, Nestern Michigan University, Kalamazoo, Michigan, 978-1-5386-8529-7/18, 2018, IEEE, pp. 3865-3868.
Mang, A., Reimann, K., and Robenacke, S., "Band gaps, crystal-field splitting, spin-orbit coupling, and exciton binding energies in ZnO under hydrostatic pressure," Solid State Communications 94, 251 (1995).
Moss, T.S., "The interpretation of the properties of indium antimonide," Proceedings of the Physical Society, Section B 67, 775 (1954).
Ruhle, S., "Tabulated Values of the Shockley-Queisser Limit for Single Junction Solar Cells," Solar Energy Consulting, vol. 130, 2016, pp. 139-147, <http://dx.doi.org/10.1016/j.solener.2016.02.15>.
Slotboom, J., and De Graaff, H., "Measurements of bandgap narrowing in Si bipolar transistors," Solid-State Electronics 19, 857 (1976).
Walukiewicz, W., Li, S., Wu, J., Yu, K., Ager, J., Haller, E., Lu, H., and Schaff, W.J., "Optical properties and electronic structure of InN and In-rich group III-nitride alloys," Journal of Crystal Growth 269, 119 (2004).
Ager, J.W., Walukiewicz, W., Shan, W., Yu, K.M., Li, S.X., Haller, E.E., Lu, H., and Schaff, W.J., "Multiphonon resonance Raman scattering in InxGa1—xN," Phys. Rev. B 72, 155204 (2005).
Arnaudov, B., Paskova, T., Paskov, P.P., Magnusson, B., Valcheva, E., Monemar, B., Lu, H., Schaff W.J., Amano, H., and Akasaki, I., "Energy position of near-band-edge emission spectra of InN epitaxial layers with different doping levels," Phys. Rev. B 69, 115216 (2004).
Berggren, K.F. and Sernelius, B.E., "Band-gap narrowing in heavily doped many-valley semiconductors," Phys. Rev. B 24, 1971 (1981).
Brodsky, M.H. and Title, R.S., "Electron Spin Resonance in Amorphous Silicon, Germanium, and Silicon Carbide," Phys. Rev. Lett. 23, 581 (1969).
Cuong, T.V., Pham, V.H., Tran, Q.T., Hahn, S.H., Chung, J.S., Shin, E.W., and Kim, E.J., "Photoluminescence and Raman studies of graphene thin films prepared by reduction of graphene oxide," Materials Letters 64, 399 (2010).
Davydov, V.Y., Klochikhin, A.A., Emtsev, V.V., Smirnov, A.N., Goncharuk, I.N., Sakharov, AV., Kurdyukov, D.A., Baidakova, M.V., Vekshin, V.A., Ivanov, S.V., Aderhold, J., Graul, J., Hashimoto, A., and Yamamoto, A., "Photoluminescence and Raman study of hexagonal InN and In-rich InGaN alloys, " Physica Status Solidi (b) 240, 425 (2003).
D'Innocenzo, V., Srimath Kandada, A.R., De Bastiani, M., Gandini, M., and Petrozza, A., "Tuning the Light Emission Properties by Band Gap Engineering in Hybrid Lead Halide Perovskite," J. Am. Chem. Soc. 136, 17730 2014).
Dixit, V., Rodrigues, B., Bhat, H., Venkataraghavan, R., Chandrasekaran, K., and Arora, B., "Growth of InSb epitaxial layers on GaAs (001) substrates of LPE and their characterizations," Journal of Crystal Growth 235, 154 (2002).
Fogal, B., O'Leary, S., Lockwood, D., Baribeau, J.-M., Noel, M., and Zwinkels, J., "Disorder and the optical properties of amorphous silicon grown by molecular beam epitaxy," Solid State Communications 120, 429 2001).
Geim, A.K. and Novoselov, K.S., "The rise of graphene," Nature Matter 6, 183 (2007).
Guo, Q., Kusunoki, Y., Ding, Y., Tanaka, T., and Nishio, M., "Properties of InGaN Films Grown by Reactive Sputtering," Japanese Journal of Applied Physics 49, 081203 (2010).
Kalt, H. and Rinker, M., "Band-gap renormalization in semiconductors with multiple inequivalent valleys," Phys. Rev. B 45, 1139 (1992).
Kong, L., Liu, G., Gong, J., Hu, Q., Schaller, R.D., Dera, P., Zhang, D., Liu, Z., Yang, W., Zhu, K., Tang, Y., Wang, C., Wei, S.-H., Xu, T., and Mao, H.-K., "Simultaneous band-gap narrowing and carrier-lifetime prolongation of organic-inorganic trihalide perovskites," Proceedings of the National Academy of Sciences 113, 8910 (2016), https://www.pnas.org/content/113/32/8910.full.pdf.
Laaziri, K., Kycia, S., Roorda, S., Chicoine, M., Robertson, J.L., Wang, J., and Moss, S.C., "High Resolution Radial Distribution Function of Pure Amorphous Silicon," Phys. Rev. Lett. 82, 3460 (1999).
Lockwood, D.J. and Wang, A.G., "Quantum confinement induced photoluminescence in porous silicon," Solid State Communications 94, 905 (1995).

(56) References Cited

OTHER PUBLICATIONS

Makin, Robert A., Quantification and Influence of Cation Sublattice Disorder in Ternary Materials With Specific Application to SnSnN2, Western Michigan University, 2019.

Manser, J.S. and Kamat, P.V., "Band filling with free charge carriers in organometal halide perovskites," Nature Photonics 8, 737 (2014).

* cited by examiner

QUANTITATIVE DISORDER ANALYSIS AND PARTICLE REMOVAL EFFICIENCY OF FIBER-BASED FILTER MEDIA

CROSS-REFERENCE TO RELATED APPLICATION

This application claims the benefit under 35 U.S.C. § 119(e) to U.S. Provisional Patent Application No. 63/219,192, filed Jul. 7, 2021, entitled "QUANTITATIVE DISORDER ANALYSIS AND PARTICLE REMOVAL EFFICIENCY OF FIBER-BASED FILTER MEDIA," and U.S. Provisional Patent Application No. 63/183,192, filed May 3, 2021, entitled "QUANTITATIVE DISORDER ANALYSIS OF PHYSICAL SYSTEMS ACROSS LENGTH SCALES," which are both incorporated herein by reference in their entirety.

STATEMENT REGARDING FEDERALLY SPONSORED RESEARCH OR DEVELOPMENT

This invention was made, in part, with government support under DMR-1410915 and DMR-2003581 awarded by the NSF. The government has certain rights in the invention.

BACKGROUND OF THE INVENTION

The present disclosure generally relates to particle removal efficiency and/or other properties of materials, including fibers and filter media such as non-woven mats and the like.

BRIEF SUMMARY OF THE INVENTION

At least one aspect of the present disclosure includes properties of a fiber filter media. The method includes extracting an order parameter squared ($S^2$) value of a fiber filter media from an image (data set) of the fiber filter media. The method further includes utilizing a predefined relationship between particle filtering efficiency (or other property) and $S^2$ to determine an estimated particle filtering efficiency (or other property) for the fiber filter media. The fiber filter media may optionally comprise a polymer fiber filter media. The predefined relationship between particle filtering efficiency and $S^2$ may optionally comprise a substantially linear function, and the particle filtering efficiency may decline as $S^2$ increases. The particle filtering efficiency may optionally comprise an organic particle filtering efficiency, and the polymer fiber filter media may optionally comprise polypropylene fibers. The method may optionally include utilizing the estimated particle filtering efficiency for the fiber filter media to adjust a parameter of a fiber filter media fabrication process to increase the particle filtering efficiency of the fiber filter media.

The fiber filter media may optionally comprise a non-woven mat, and the polymer fiber filter media may comprise at least one polymer selected from the group consisting of polypropylene, polybenzimidazone (PBI), polyester and polypropylene/polyethylene bicomponent spunbond fibers (PP/PE-BCS).

The image of the fiber filter media may be digital, and may comprise a scanning electron microscope (SEM) image or a Raman spectroscopy image. Extracting the $S^2$ value from the image may include: 1) selecting a region of interest from the image; 2) fitting two curves to a pixel intensity histogram of the region of interest, the curves corresponding to bright and dark areas of the image; and 3) determining $S^2$ by calculating a ratio of the area of the bright area to a total area, wherein the total area is the sum of the bright and dark areas.

One or more steps of the method may be implemented utilizing a computer that is configured (e.g. programmed) to implement at least some steps of the method (process).

The method may further include fabricating a filter using the fiber filter media, and the filter may comprise a mask, or a filter configured to be used in a HVAC system, a powered air filter, or other filtering device.

Another aspect of the present disclosure is a method of fabricating fiber filter media. The method includes determining a predefined relationship between an order parameter squared ($S^2$) of the fiber filter media and a process parameter of a fabrication process used to fabricate the fiber filter media. The method includes determining $S^2$ for a fiber filter media made using the fabrication process. The method further includes utilizing a predefined relationship between $S^2$ and a property of the fiber filter media to adjust the process parameter to control (change) the property of the fiber filter media. The fiber filter media may comprise polymer fibers.

The property of the fiber filter media may optionally comprise particle removal efficiency, and the process parameter may be adjusted to increase the particle removal efficiency. The fiber filter media may comprise polymer fibers selected from the group consisting of polypropylene, polybenzimidazone (PBI), polyester and polypropylene/polyethylene bicomponent spunbond fibers (PP/PE-BCS).

The fiber filter media may comprise a non-woven mat of polymer fibers. The method may include extracting the order parameter squared ($S^2$) value of a fiber filter media from an image (or other data set) of the fiber filter media, and utilizing a predefined relationship particle filtering efficiency and $S^2$ to determine an estimated particle filtering efficiency for the fiber filter media.

The method may include forming a protective article such as a mask by positioning the fiber filter media between protective layers of porous material.

The method may include forming a filter configured for use in at least one of a HVAC system and a powered air filtration unit.

Another aspect of the present disclosure is controlling the Young's Modulus of a material by controlling the degree of disorder (value of $S^2$) of the material.

These and other features, advantages, and objects of the present device will be further understood and appreciated by those skilled in the art upon studying the following specification, claims, and appended drawings.

DETAILED DESCRIPTION

Figure 4B:
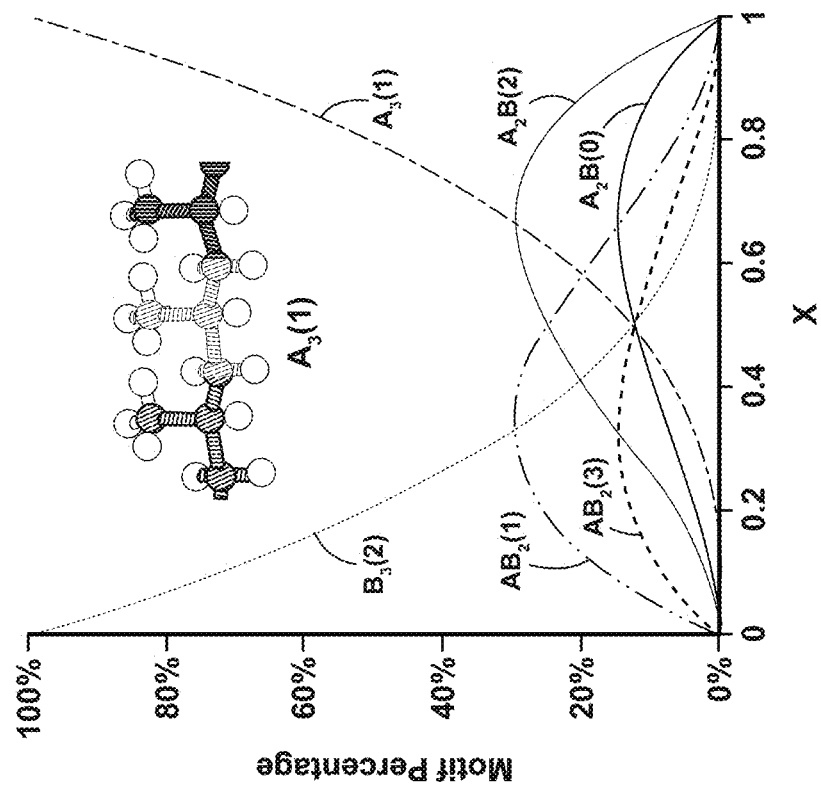
FIG. 4B is a graph showing the percentage of each structural motif for polypropylene as a function of x at S=0, wherein the inset shows an $A_3$ (1) motif.
Figure 4A:
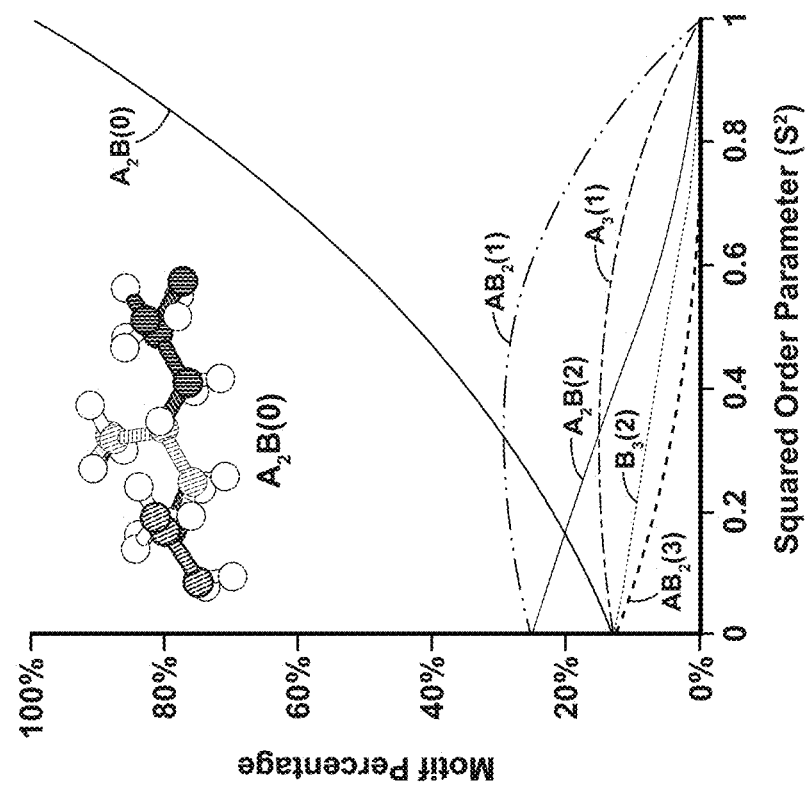
FIG. 4A is a graph showing the percentage of each structural motif for a polypropylene material as a function of $S^2$ at a balanced composition of x=0.5, wherein the inset shows a possible reference motif $A_2B(0)$.

For purposes of description herein the terms "upper," "lower," "right," "left," "rear," "front," "vertical," "horizontal," and derivatives thereof shall relate to a polymer chain as oriented in FIGS. 4A and 4B. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Additionally, unless otherwise specified, it is to be understood that discussion of a particular feature or component extending in or along a given direction or the like does not mean that the feature or component follows a straight line or axis in such a direction or that it only extends in such direction or on such a plane without other directional components or deviations, unless otherwise specified.

There are many applications where the introduction of controlled disorder into a material can enhance a property of interest. The study of quantifying the degree of disorder in materials emerged in the middle 20$^{th}$ century from x-ray diffraction studies of binary metal alloys, such as AuCu and ZnCu. In order to describe the observed changes in x-ray diffraction peak intensity as samples of metal binary alloys were heated, Bragg and Williams defined an order parameter, S, commonly referred to now as the Bragg-Williams order parameter. For an alloy with constituent elements A and B, it may be expressed as:

$$S = r_A + r_B - 1 \qquad (1)$$

where $r_A$, is the fraction of "A" atoms on A-atom lattice sites, and $r_B$ is the fraction of "B" atoms on B-atom lattice sites. In this context, we reference the perfectly ordered structure where all atoms are on their respective (ideal) site. For such a sample S is equal to unity, which means that the sample must have: equal numbers of A and B atoms, A-atom lattice sites only occupied by A atoms, and B-atom lattice sites only occupied by B atoms (i.e., $r_A=r_B=1$). At the other extreme for such a sample, in which the A and B atoms are randomly distributed over both A-atom and B-atom lattice sites (i.e., $r_A=r_B=0.5$), S is equal to 0.

In some cases, the order parameter may be determined through x-ray diffraction. However, as discussed in more detail below, S may be measured utilizing other techniques, including Raman spectroscopy, reflection high-energy electron diffraction, transmission electron microscopy and scanning electron microscopy (SEM). Each of these techniques directly measure $S^2$ instead of S, and $S^2$ values are therefore discussed herein. It will be understood that, as used herein, "order parameter" broadly refers to a measure of disorder, and "order parameter" is not limited to S or $S^2$ as disclosed herein.

In general, it may be possible to correlate disorder to system-level properties in some situations through the application of an (sing model in conjunction with cluster expansion theory, where a linear relationship between the system-level property and $S^2$ emerges. The present disclosure discusses the disorder in fibrous networks (e.g., polypropylene-based fibers) of fiber-based filter media of the type that may be utilized in personal protective equipment such as masks and in filters (e.g., powered air filters, filters for HVAC systems, etc.). System level properties of the network of fibers (e.g., filtering efficiency) may vary linearly with the square of the order parameter ($S^2$). Thus, the system level properties for these materials can be controlled and tuned by systematically varying the degree of disorder present in the fiber or polymer of the filter media. This can be advantageous at both the design and manufacturing stages. This may apply to particulate masks such as those used by healthcare and construction workers, water filtration, air conditioning filters, and protective safety vests such as those made of Kevlar®. This is also believed to apply to properties of individual polymers, where the property of interest may be, for example, strength, UV tolerance, or (in the case of OLEDs such as those used in displays) the color of emitted light and the material resistivity through analysis of published temperature-dependent measurements.

Methods

In an example according to an aspect of the present disclosure, the $S^2$ value of published Raman spectra of polypropylene samples was measured in accordance with the approach of Loveluck and Sokoloff, "Theory of the optical properties of phonon systems with disordered force constants, with application to NH$_4$Cl," J. Phys. Chem. Solids 34, 869 (1973), as well as from intensity analysis of SEM images. Peaks in a Raman spectrum associated with the S=1 ordered structure have integrated intensities proportional to S$^2$, while peaks associated with the completely disordered structure have an integrated intensity proportional to (1−S$^2$). The corresponding equations can then be rearranged to extract the order parameter from the Raman spectrum of a single sample. Specifically, $$J_{S=1}/J_{S=0} = S^2/(1-S^2) \quad (2)$$

where $J_{S=1}$ is the integrated intensity of a peak associated with the ordered structure, and $J_{S=0}$ is the integrated intensity of the disordered structure feature.

Figure 1B:
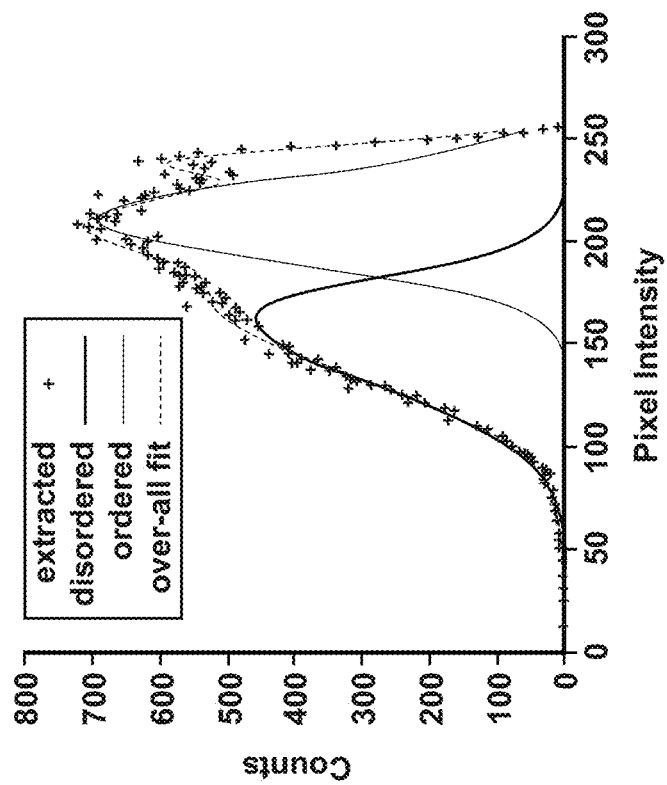
FIG. 1B is a graph showing an $S^2$ analysis of a pixel intensity histogram of an SEM image of a second polypropylene sample, resulting in an $S^2$ value of 0.5152.
Figure 1A:
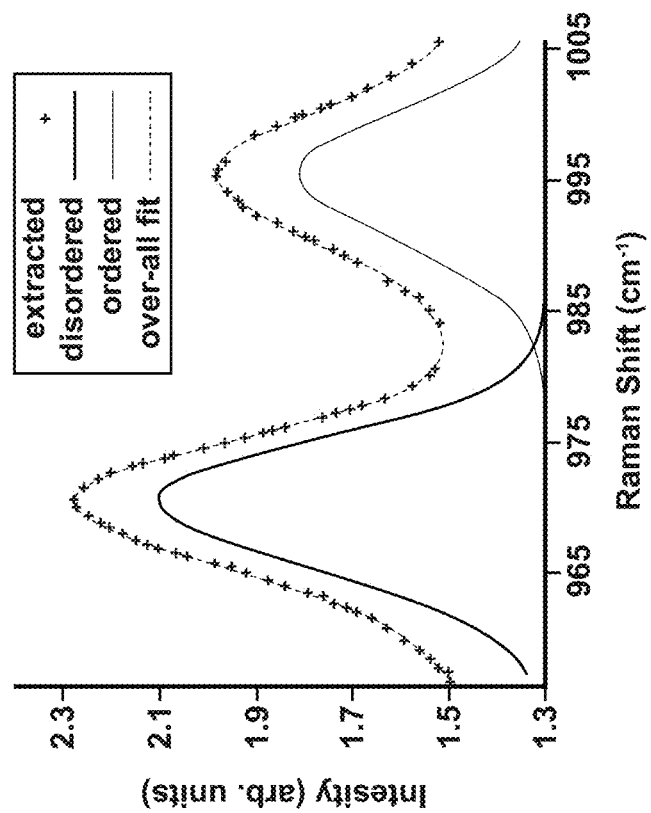
FIG. 1A is a graph showing an intensity versus Raman shift analysis of a first polypropylene sample, resulting in an $S^2$ value of 0.3937.

FIG. 1A shows the results of an S$^2$ analysis according to the present disclosure (implemented utilizing a computer) on a published Raman spectrum of a polypropylene sample. The peak near 970 cm$^{-1}$ is the peak associated with disordered polypropylene, and the peak near 995 cm$^{-1}$ is the peak associated with completely ordered polypropylene.

In the case of SEM image analysis, the S$^2$ value of a sample is equal to the percentage of sample image area corresponding to bright regions. However, bright and dark areas corresponding to the ordered and disordered regions, respectively, can be identified by first thresholding the image near the average pixel intensity of the bright regions.

With reference to FIG. 1B, the analysis process (extraction of S$^2$) involves utilizing a computer to fit two curves to the pixel intensity histogram, one representing the disordered regions and one representing the ordered regions. The threshold for the image may be chosen at the peak of the ordered curve, or it may be selected at an integer multiple of the standard deviation, σ, away from the peak of the ordered curve, depending on the relative location of the intersection between the ordered and disordered curves.

Figure 1C:
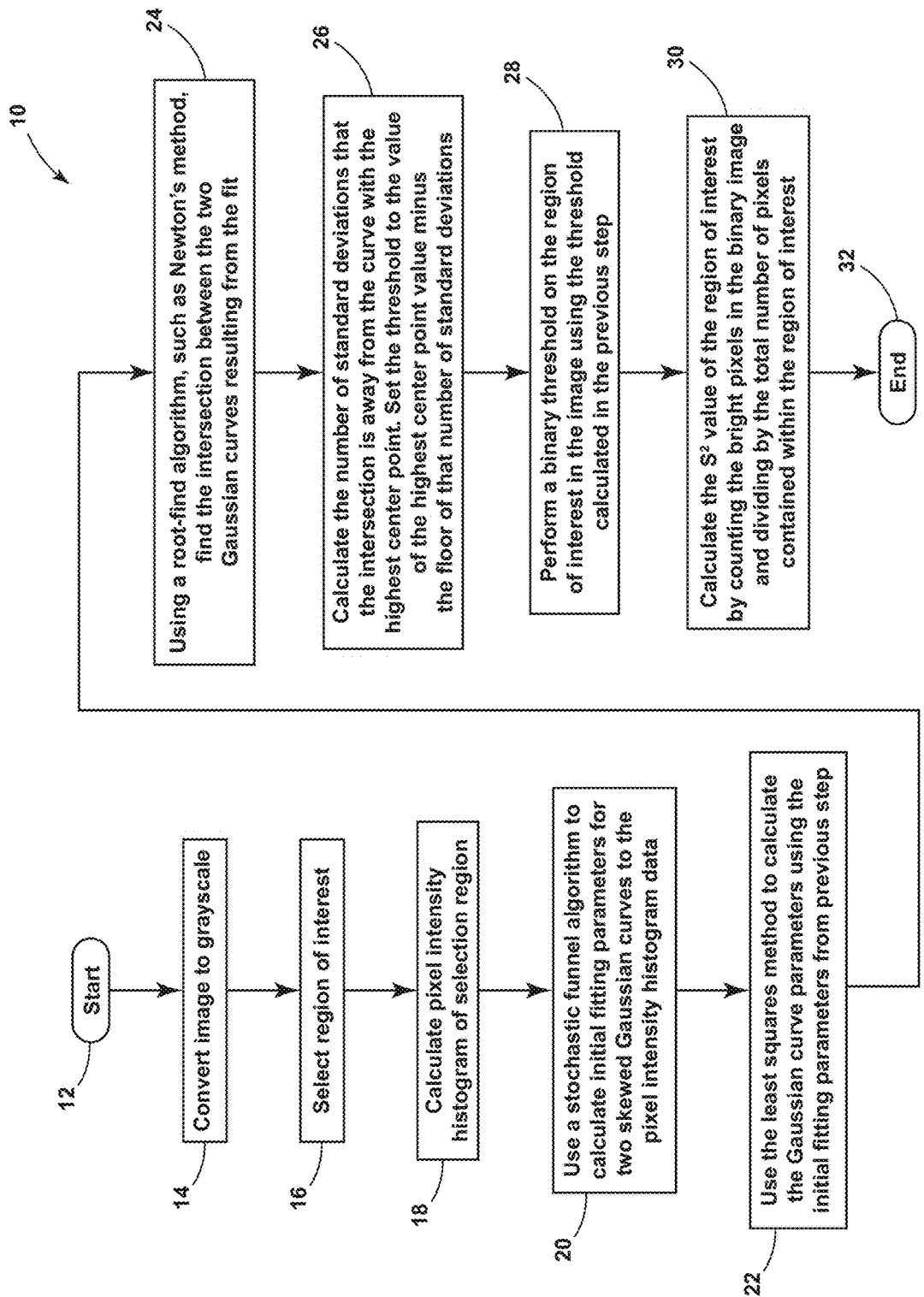
FIG. 1C is a flowchart showing a process for extracting an order parameter squared ($S^2$) value from an image.
Figure 1D:
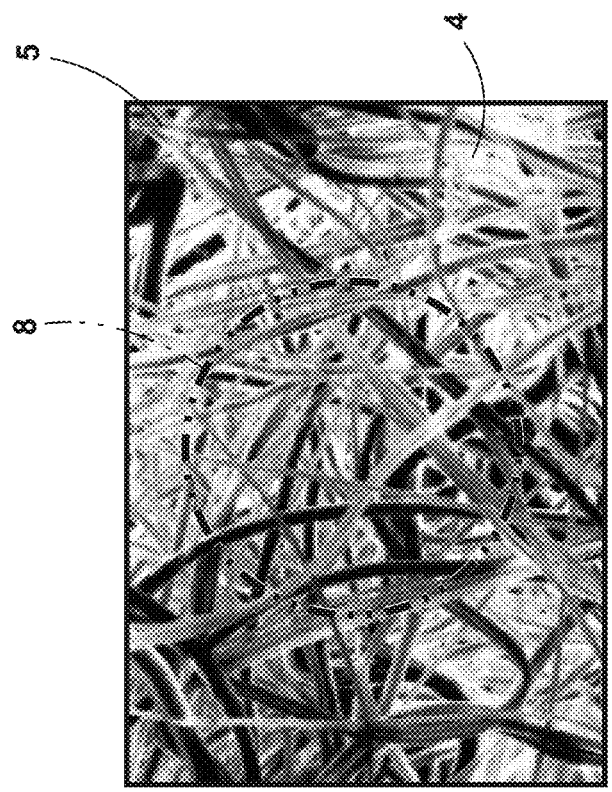
FIG. 1D is a partially schematic enlarged view of a fiber-based filter media.

FIG. 1C shows a process 10 for calculating the threshold value of an image 5 (FIG. 1D) of a sample 4 of fiber-based filter media. It will be understood that one or more steps of process 10 may be implemented utilizing a computer that is configured (e.g. programmed) to execute the steps. Process 10 starts as shown at 12, and proceeds to step 14 which includes converting the image 5 to grayscale. A region of interest 8 (FIG. 1D) may be selected as shown in step 16. In general, the region of interest 8 may be selected before or after converting an image to grayscale. The region of interest 8 may be selected by an individual inspecting one or more images 5, or the region of interest 8 may be selected by a computer algorithm. In general, the region of interest may have virtually any shape, and may be selected to leave out (exclude) regions having defects or artifacts that are not representative of the sample 4.

The process 10 further includes calculating a pixel intensity histogram of the selected region 8 (see, e.g., FIG. 1B). At step 20, an algorithm (e.g., a stochastic funnel algorithm) is used to calculate initial curve fitting parameters for two skewed Gaussian curves to the pixel intensity histogram data. In the example of FIG. 1B, the skewed Gaussian curves are shown as the disordered and ordered curves, and the over-all fit is also shown in FIG. 1B. Referring again to FIG. 1C, at step 22, the least squares method is used to calculate the Gaussian curve parameters using the initial curve fitting parameters from step 20.

At step 24, a root-finding algorithm (e.g., Newton's method) is used to find the intersection between the two Gaussian curves resulting from the fit. At step 26, a number of standard deviations at the intersection is away from the curve where the highest center point is calculated. The threshold value is set to the value of the highest center point value minus the floor of that number of standard deviations.

At step 28, a binary threshold is performed on the region of interest 8 in the grayscale image 5 (FIG. 1D) using the threshold calculated in step 26. This results in a black and white image (not shown) with black (dark) and white (bright) regions corresponding to disordered and ordered regions, respectively. At step 30, the squared order parameter (S$^2$) value of the region of interest 8 is calculated by counting the bright (white) pixels in the binary image and dividing this number by the total number of pixels (white and black) contained with the region of interest. Because the areas of each pixel is the same, the ratio of bright pixels to total pixels is equal to a ratio of the white area to the total area. The method 10 then ends as shown at 32.

Results and Discussion

One method for experimentally verifying that a material or system can have states of varying degrees of ordering is by measuring S$^2$ of a sample as a function of temperature. Landau theory describes order-disorder transitions as second-order transitions, and as a result, the order parameter of a system as a function of temperature is:

$$S(T) = \sqrt{\alpha_0(T_C-T)/\beta} \quad (3)$$

where $\alpha_0$ and $\beta$ are material-dependent constants, and $T_C$ is the critical temperature below which S=0. Squaring both sides of Eq. 3 yields:

$$S^2(T) = (\alpha_0/\beta)T_C - (\alpha_0/\beta)T \quad (4)$$

Therefore, if S$^2$ exhibits a linear trend with temperature for a system, it can be taken as evidence that the system is undergoing an order-disorder transition.

Figures 2A, 2B:
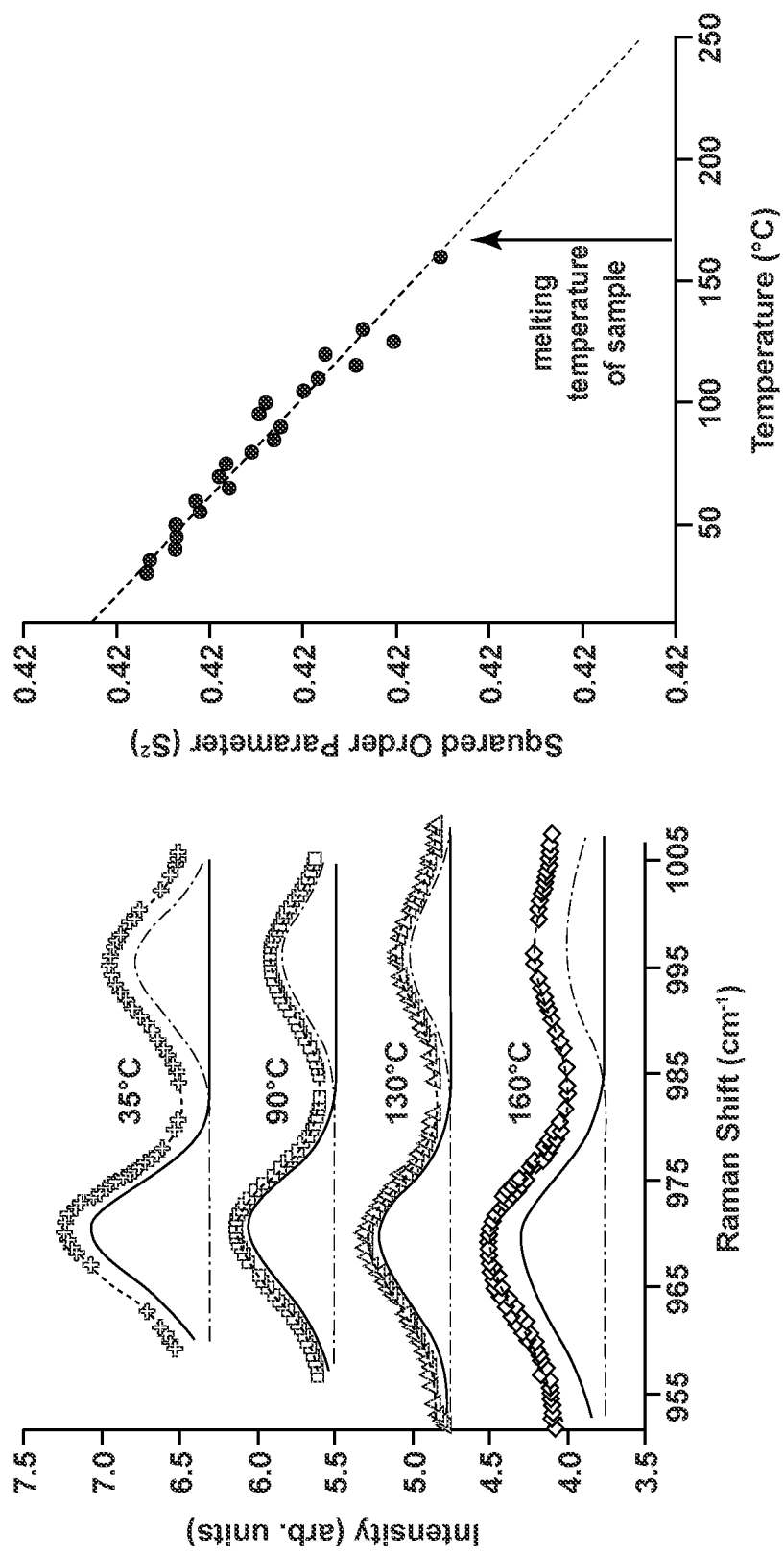
FIG. 2A is a graph showing Raman spectra for polypropylene with curve fits to the peaks near 970 cm$^{-1}$ and 985 cm$^{-1}$ for selected temperatures from Hiejima et al. (2017) Macromolecules 50, 5867-5876.
FIG. 2B is a graph showing $S^2$ as a function of temperature for polypropylene, wherein $S^2$ is extracted using an example aspect of the present disclosure from Raman spectra reported by Hiejima et al. (2017) between 30 to 160° C. at intervals of 5° C.

FIGS. 2A and 2B show the results of such an analysis applied to the reported Raman spectra of a polypropylene sample systematically heated in 5° C. increments from 30° C. to 225° C. (see Hiejima, Y. et al., "Investigation of the Molecular Mechanisms of Melting and Crystallization of Isotactic Polypropylene by in Situ Raman Spectroscopy," Macromolecules, Vol. 50, 2017, pp. 5867-5876). In order to apply Eq. 2 to extract S$^2$, two peaks are first identified in the Raman spectrum of polypropylene, one arising from disorder and one arising from order. According to the Landau theory, S should decrease with increasing temperature, and thus disorder-related peaks (which have a (1−S$^2$) dependence) should increase in intensity with increasing temperature, whereas peaks associated with the ordered structure (which have an S$^2$ dependence) should decrease in intensity with increasing temperature.

From FIG. 2A, it can be seen that with increasing temperature, the peak at 995 cm$^{-1}$ is decreasing in intensity while the peak at 970 cm$^{-1}$ is increasing in intensity; thus, the peak at 995 cm$^{-1}$ is associated with the ordered structure and the peak at 970 cm$^{-1}$ is associated with the disordered structure. Using these two peaks and Eq. 2, S$^2$ was estimated for the Raman spectra reported by Hiejima et al. for temperatures up to the melting point (see Hiejima, Y. et al., "Investigation of the Molecular Mechanisms of Melting and Crystallization of Isotactic Polypropylene by in Situ Raman Spectroscopy," Macromolecules, Vol. 50, 2017, pp. 5867-5876). The results, plotted as a function of temperature in FIG. 2B, show a clear linear trend between S$^2$ and temperature—as predicted by the Landau theory for a system undergoing an order-disorder transition. This provides additional evidence that polymers (e.g., polypropylene polymers) may have some degree of disorder somewhere within their structure, as has been previously established using x-ray diffraction (see Hikosaka, M. et al., "The order of the molecular chains in isotactic polypropylene crystals," Polymer Journal, Vol. 5, 1973, pp. 111-127; Auriemma, F. et al., "Structural Disorder in the a Form of Isotactic Polypropylene," Macromolecules 33, Oct. 1, 2000; and De Rosa, C. et al., "A polymorphism in polymers: A tool to tailor material's properties," Polymer Crystallization, 2020, 3:e10101).

Figure 3:
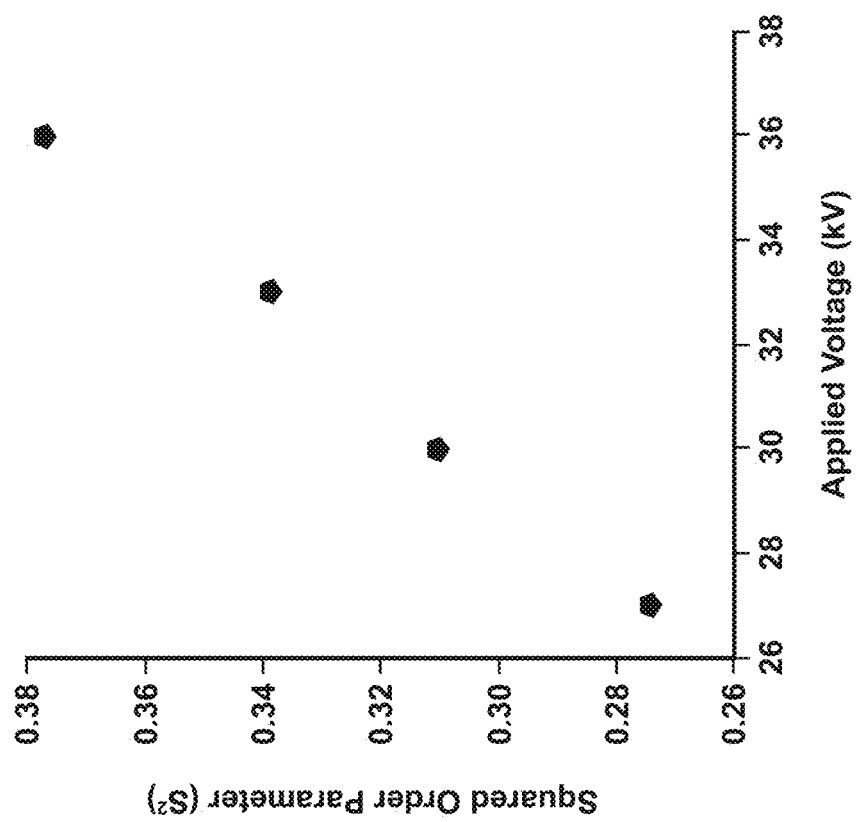
FIG. 3 is a graph showing calculated $S^2$ value of a polypropylene material versus voltage used during a melt-electrospinning process employed to make the polypropylene material.

Another property of polymers such as polypropylene that can be obtained from the data in FIG. 2A is the critical temperature, $T_C$. From Eq. 3, $T_C$ is equal to the dependent-axis intercept of the line defined by the $S^2$ versus Tc relationship. Applying linear regression to the data in FIG. 2B, Tc for the order-disorder transition in a polypropylene sample was found to be 834° C. This transition temperature is well above the melting point of polypropylene, which may, at least initially, seem to rule out the possibility of achieving a zero value of $S^2$, or even an $S^2$ value below 0.30. However, it may be possible to achieve such $S^2$ values through non-equilibrium growth conditions. For example, an $S^2$ close to 0 for $ZnSnN_2$ has been achieved through plasma-assisted molecular beam epitaxy at a temperature of 420° C. (Appendix A), a non-equilibrium crystal growth technique, despite the fact that the critical temperature for $ZnSnN_2$ is predicted to be over 3000 K (see Lany, S. et al., "Monte Carlo simulations of disorder in $ZnSnN_2$ and the effects on the electronic structure," Phys. Rev. Materials, Vol. 1, 035401 August 2017). Melt-electrospinning is an example of a technique for polypropylene that can reach $S^2$ values corresponding to temperatures above its melting point. Melt-electrospinning processes may be used in mask production. FIG. 3 shows the influence of the applied voltage on the $S^2$ value of the resulting polypropylene during a melt-electrospinning process, confirming that such an approach can be used to access low values of the Bragg-Williams order parameter for this material.

Disorder in polypropylene is related to variations in orientation of the methyl groups relative to the polymer chain. This is commonly referred to as tacticity; the methyl groups are on the same side of the chain for isotactic polypropylene, on alternating sides for syndiotactic polypropylene, and randomly aligned for atactic polypropylene. This tacticity can be represented using an (sing model wherein a spin "up" is assigned to a methyl group on one side of the polymer chain and a spin "down" is assigned to a methyl group located on the opposite side of the polymer chain. (sing models have previously been developed and applied to polymers such as isotactic vinyl polymer. However, the approach described herein is fundamentally different. Whereas previous models considered the entire set of possible sequences that can occur in a given chain, disorder may be described herein in terms of the percentages of the structural motifs present in the polymer. Although the set of complete structural motifs described herein is contained within previous models, previous models may obscure the fundamental importance of the variety of structural motifs in determining system-level properties.

A methodology for modelling disorder is described in U.S. patent application Ser. No. 17/011,648 filed Sep. 3, 2020, entitled "Band Gap Engineered Materials," and U.S. patent application Ser. No. 17/313,947 filed May 6, 2021, entitled "Method of Developing Vaccines," the entire contents of which are incorporated herein by reference. This methodology may be utilized to identify the reference structural motif associated with the ordered structure as three polypropylene blocks with methyl groups on alternating sides with respect to each other, as shown in the inset of FIG. 4A. This defines the syndiotactic structure as the S=1 structure (since an S=1 structure must have equal numbers of spins, which in this case corresponds to equal numbers of methyl groups on opposite sides of the polymer chain). There are six other possible structural motifs, one of which—the $A_3$ (1) motif—is shown inset in FIG. 4B. In this notation scheme, "A" denotes a methyl group oriented in the "upward" direction (for the orientation of the polymer chain shown in the insets of FIGS. 4A and 4B) and "B" denotes a methyl group oriented in the opposite direction, which in this case is out of the page as shown by the red and black highlighted methyl groups in the inset of FIG. 4A for the $AB_2$ (0) motif. The number in parenthesis represents the number of methyl groups in the opposite orientation of the corresponding methyl group characterizing the reference (S=1) motif. Thus, $A_3$ (1) denotes the motif with all upward-oriented methyl groups, with one methyl group misoriented relative to the reference motif.

The six other possible structural motifs only occur within the polymer when some degree of disorder is present in the structure, with the percent occurrence depending on both S and x, where x is the fraction of methyl groups oriented along a specific side of the polymer. Thus, isostatic polypropylene with methyl groups oriented along one side would have x=1, while isostatic polypropylene with methyl groups oriented along the opposite side would have x=0. FIG. 4A shows the percentage of each motif present in polypropylene with x=0.5 as a function of $S^2$, and FIG. 4B plots the percentage of each motif at S=0 as a function of x.

A system-level property dominated by pair interactions can be expressed as:

$$P(x, S) = [P(x=0.5, S=1) - P(x, S=0)]S^2 - P(x, S=0) \quad (5)$$

where P(x, S) is the system property at the given composition x and degree of ordering S. To investigate whether the particle removal efficiencies of polymer fiber filter media (polypropylene masks and filters) is such a system-level property of this material, $S^2$ values of fiber-based polypropylene masks and filters were extracted from SEM images (see Lee, S. et al., "Reusable Polybenzimidazole Nanofiber Membrane Filter for Highly Breathable PM2.5 Dust Proof Mask", ACS Applied Materials & Interfaces 11, Jan. 7, 2019, pp. 2750-2757).

Figure 5A:
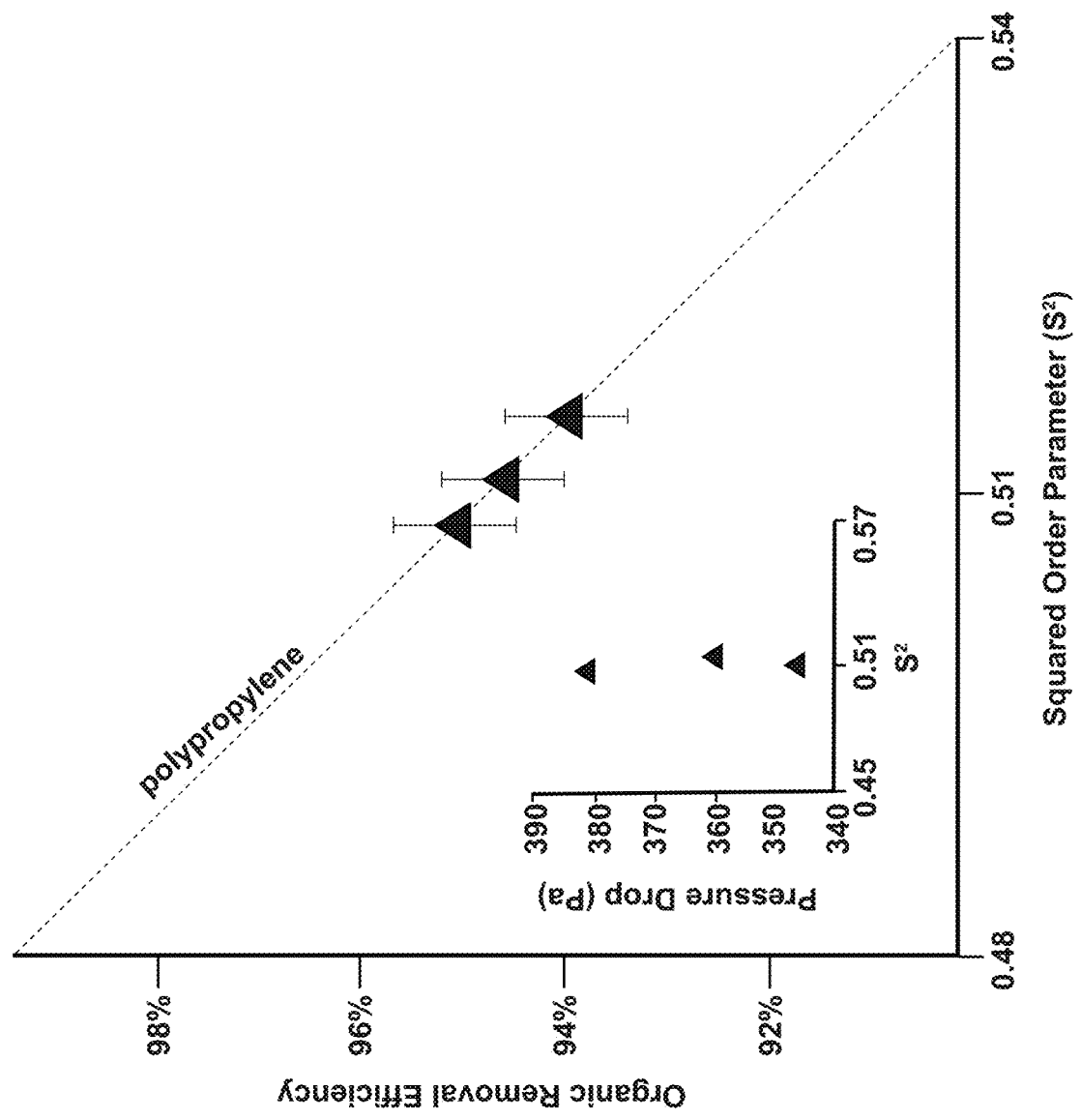
FIG. 5A is a graph showing organic removal efficiencies as a function of $S^2$ for three different polypropylene-based mask filters, wherein the inset is the pressure drop across each filter as a function of $S^2$, and wherein the error bars for $S^2$ values are within (less than) the size of the symbols.

It was determined that the reported filtering efficiency (measured using organic particulate matters generated from dioctyl phthalate) follows a linear trend with $S^2$ predicted by Eq. 5, as shown in FIG. 5A. In general, the particle removal efficiency of filters and masks increases with increasing disorder in the polypropylene. A possible explanation for this trend may be found by considering the structural motifs that occur with increasing disorder. Specifically, the motifs dominated by methyl groups on the same side of the polymer chains occur in increasing percentages as S decreases, as can be seen in FIG. 4A for the case of x=0.5, while the percentage of the reference motif with a sequence of methyl groups on alternating sides decreases with decreasing $S^2$. Not wishing to be bound by a specific theory, this nevertheless suggests that same-side methyl-group-dominated motifs may provide a more significant barrier to particles passing through than the alternating-side reference motif, leading to better particle filtering (removal) efficiencies for more disordered polypropylene structures.

Figure 5B:
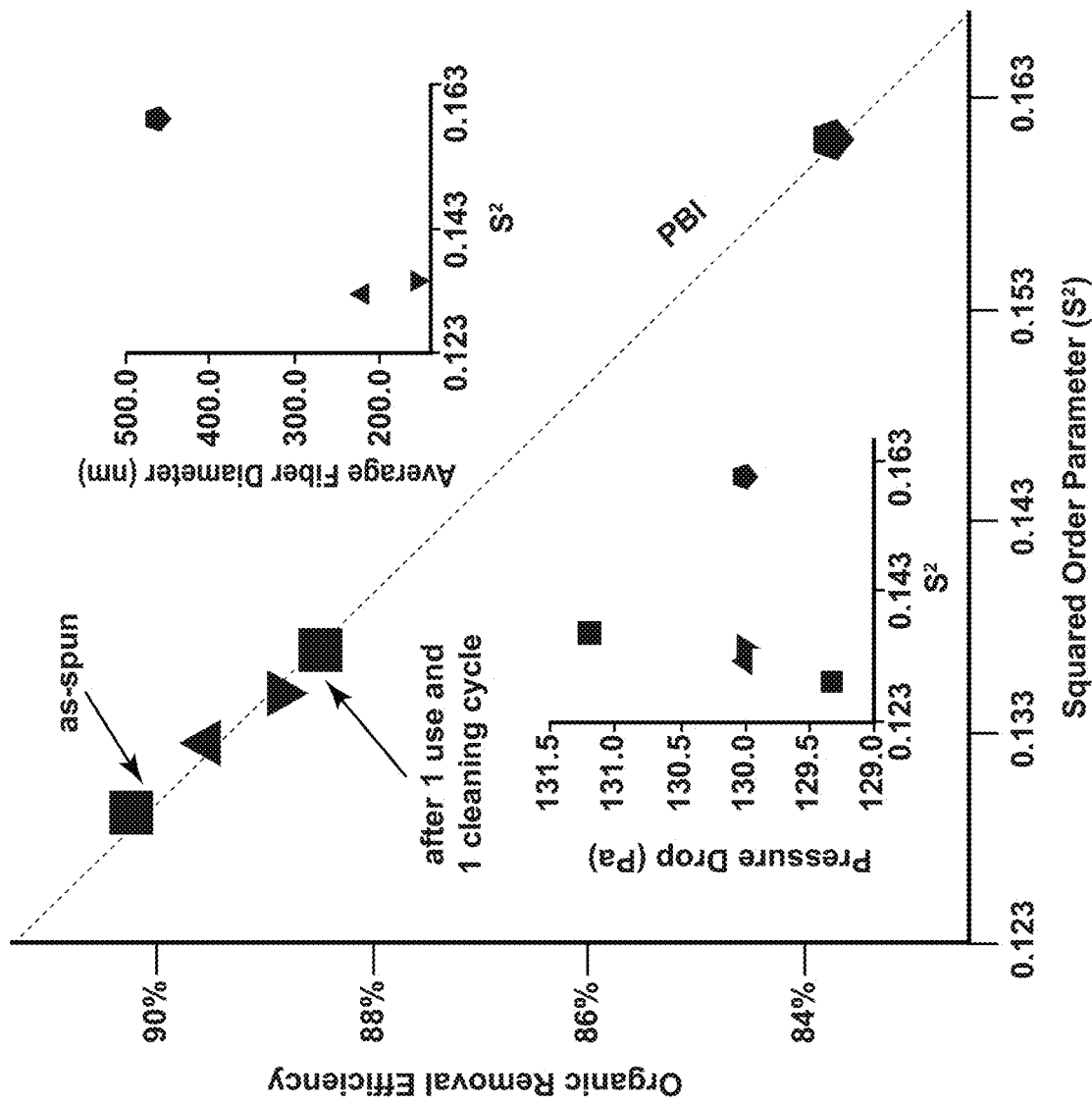
FIG. 5B is a graph showing organic removal efficiencies of polybenzimidazole (PBI) filters as a function of $S^2$, wherein the inset at the bottom left is the pressure drop across each filter as a function of $S^2$, and the inset at the top right is the average fiber diameter as a function of $S^2$, and wherein the error bars for $S^2$ values are within (less than) the size of the symbols.
Figure 5C:
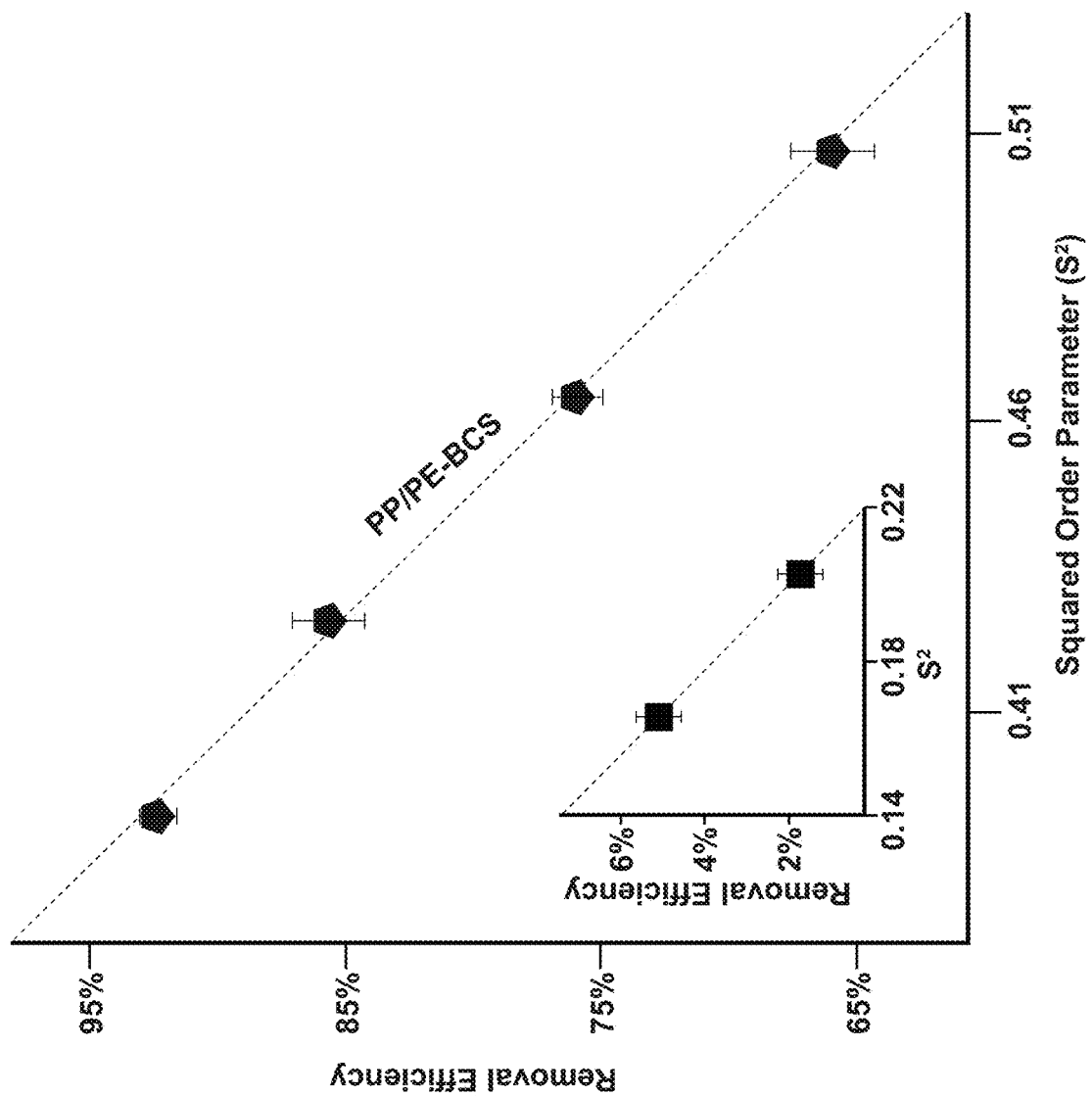
FIG. 5C is a graph showing filtering efficiencies as a function of $S^2$ for polypropylene/polyethylene bicomponent spunbond (PP/PE-BCS) fibers, wherein the inset is the filtering efficiency as a function of $S^2$ for filters made of polyester, and wherein the error bars for $S^2$ values are within (less than) the size of the symbols.

An $S^2$ analysis according to an aspect of the present disclosure was applied to masks made of other fibrous filter media materials, such as polybenzimidazole (PBI), polyester and polypropylene/polyethylene bicomponent spunbond fibers (PP/PE-BCS). FIGS. 5A-5C show the results of these analysis for these materials.

The results for three different commercial polypropylene-based mask filters are shown in FIG. 5A. The inset of FIG. 5A is the pressure drop across each filter as a function of $S^2$, and wherein the error bars for $S^2$ values are within the size of the symbols, and error bars for measured quantities from the literature, such as removal efficiencies, are included when reported.

For the PBI samples (FIG. 5B), the filtering efficiency was measured using organic particulate matters generated from dioctyl phthalate (see Lee, S. et al., "Reusable Polybenzimidazole Nanofiber Membrane Filter for Highly Breathable PM2.5 Dust Proof Mask", ACS Applied Materials & Interfaces 11, Jan. 7, 2019, pp. 2750-2757). In FIG. 5B, the inset at the bottom left is the pressure drop across each filter as a function of $S^2$, and the inset at the top right is the average fiber diameter as a function of $S^2$, and wherein the error bars for $S^2$ values are within the size of the symbols, and error bars for measured quantities from the literature, such as removal efficiencies, are included when reported.

For the PP/PE-BCS (FIG. 5C), the removal efficiencies were measured using charge neutral sodium chloride (see Liu, J. et al., "Low resistance bicomponent spunbond materials for fresh air filtration with ultra-high dust holding capacity," RSC Advances 7, 2017, pp. 43879-43887), and for the polyester samples the removal efficiencies were measured for particles with a diameter of 0.5 microns (see Agranovski, I. E. et al., "Enhancement of the performance of low-efficiency HVAC filters due to continuous unipolar ion emission," Aerosol Science and Technology 40, 2006, pp. 963-968). In FIG. 5C, the inset is the filtering efficiency as a function of $S^2$ for filters made of polyester, and wherein the error bars for $S^2$ values are within the size of the symbols, and error bars for measured quantities from the literature, such as removal efficiencies, are included when reported.

As shown in FIGS. 5B and 5C and the inset of FIG. 5C, as in the case of polypropylene, each of these materials demonstrates a linear relationship between their filtering efficiency and $S^2$.

While the particle removal efficiency of a filter media is typically associated with features such as fiber diameter (with smaller diameter fibers yielding higher removal efficiencies), the trend seen in the removal efficiencies above may actually be due to the ordering of the material. Evidence for this can be seen in the graph inset in the top right of FIG. 5B, which shows the average fiber diameter as a function of $S^2$ for three PBI films. The plot shows that there is no linear trend between the average fiber diameter and $S^2$, while for the same three filters there is a linear trend between the $S^2$ of the polymers and the filter removal efficiency. Thus, the results shown in FIGS. 5A-5C demonstrate that a model of disorder described herein for polypropylene has applications to a broad range of polymer-based fibers.

Additionally, the insets to FIGS. 5A and 5B plot the pressure drop across the polypropylene and PBI based filters as a function of $S^2$. While all of the samples of each material lie on the same $S^2$ line for the removal efficiency, the pressure drops of the same filters do not fall along a single line for each material. Thus, there does not appear to be a linear relationship between $S^2$ of the material and the pressure drop of the type predicted by a spin-based model according to the present disclosure. This result suggests that pressure drop, unlike the filter efficiency, is not dominated by the ordering of the polymers, and instead is driven by the larger structural features of the filter, such as number and density of layers in the filter. Raman spectroscopy and SEM are straightforward and powerful techniques for characterizing and understanding these fiber structures. A model according to an aspect of the present disclosure provides a way to achieve masks with improved filtering efficiencies and lower pressure drops. Specifically, the $S^2$ values of the polymers in the filter media and the overall structure of the filter and filter media can be tuned (adjusted) during fabrication to improve the filter efficiency and/or reduce pressure drops.

Figure 6:
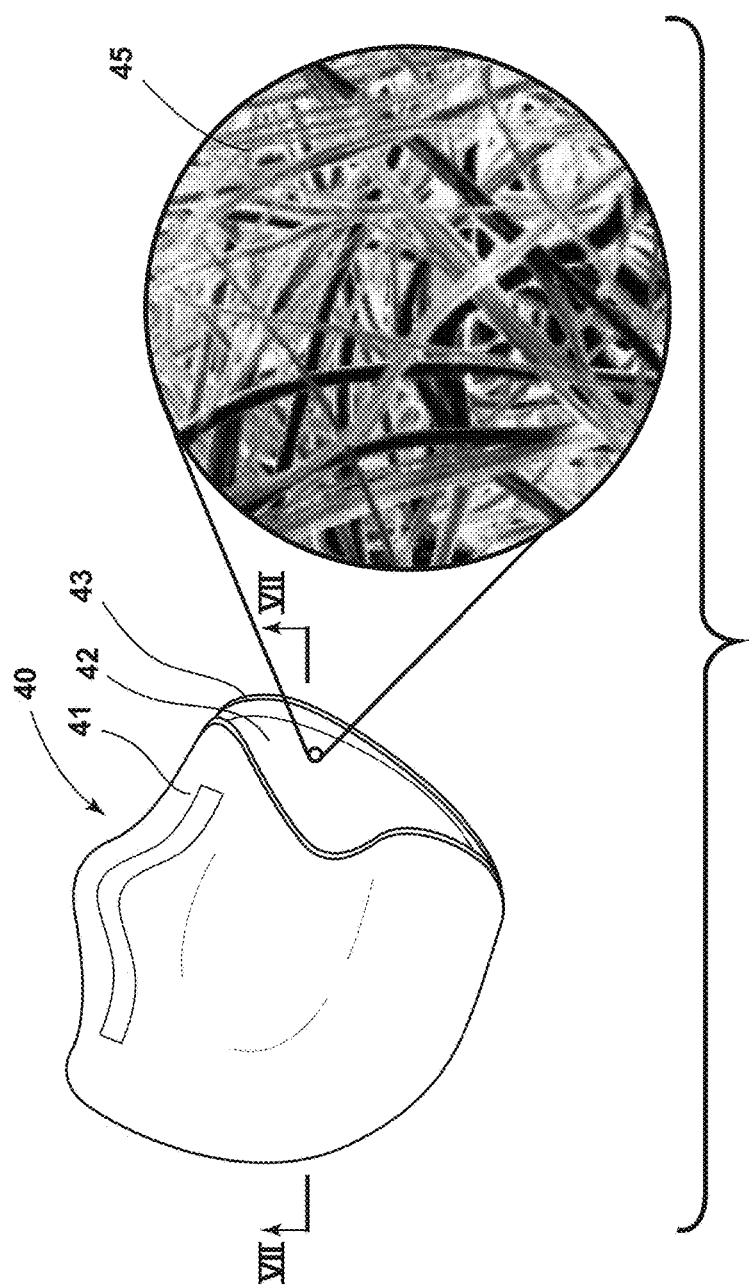
FIG. 6 is an isometric view of a protective mask.
Figure 7:
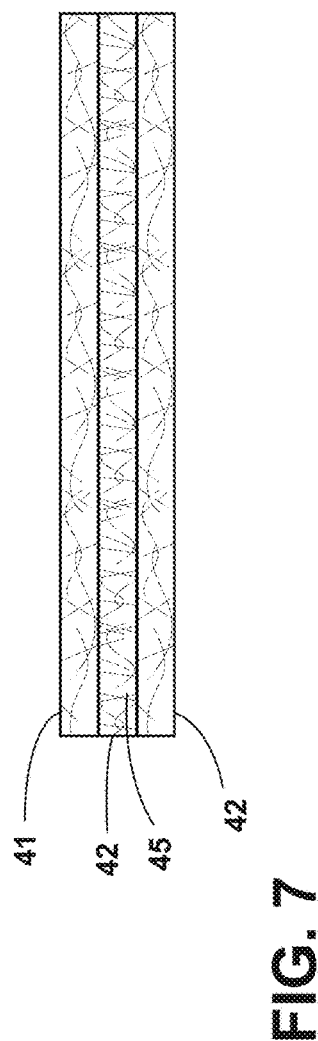
FIG. 7 is a partially schematic cross sectional view of the mask of FIG. 6 taken along the line VII-VII.
Figure 8:
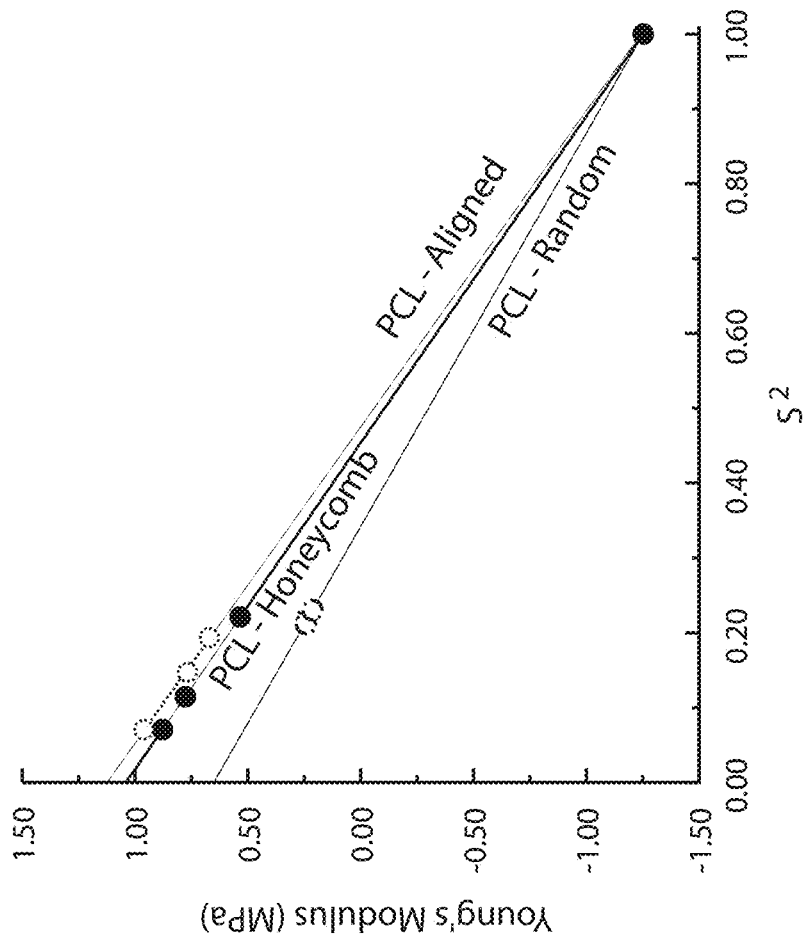
FIG. 8 is a graph showing Young's Modulus as a function of $S^2$ for various materials.
Figure 9:
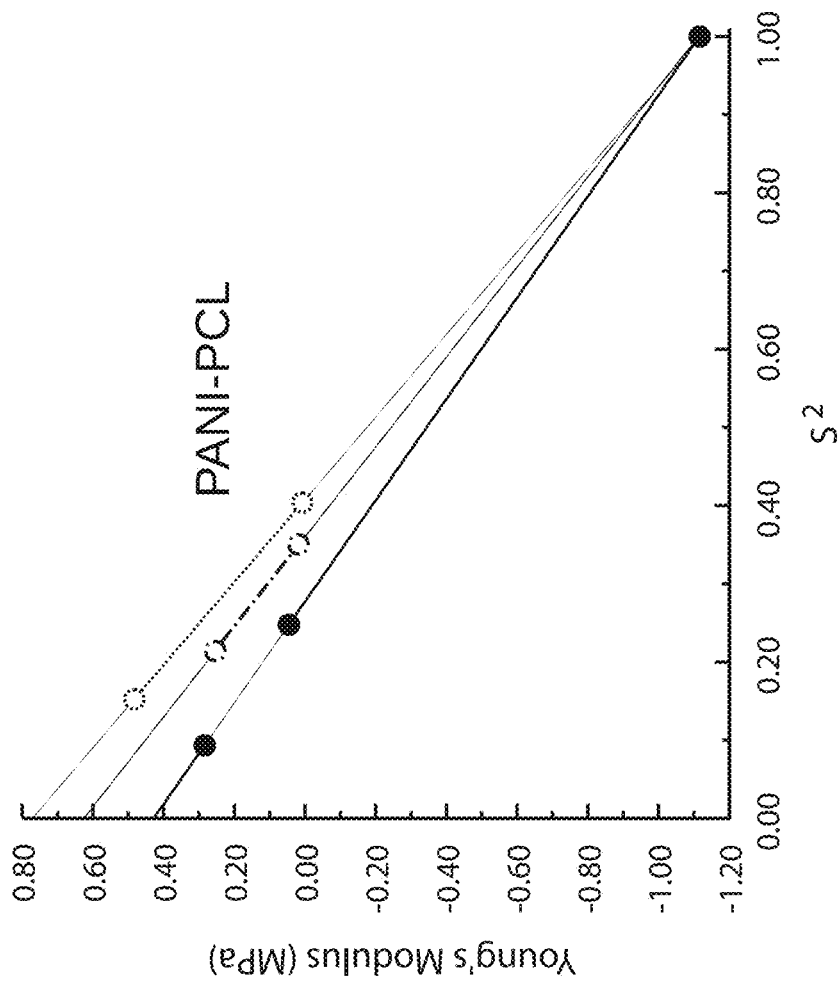
FIG. 9 is a graph showing Young's Modulus as a function of $S^2$ for various materials.
Figure 10:
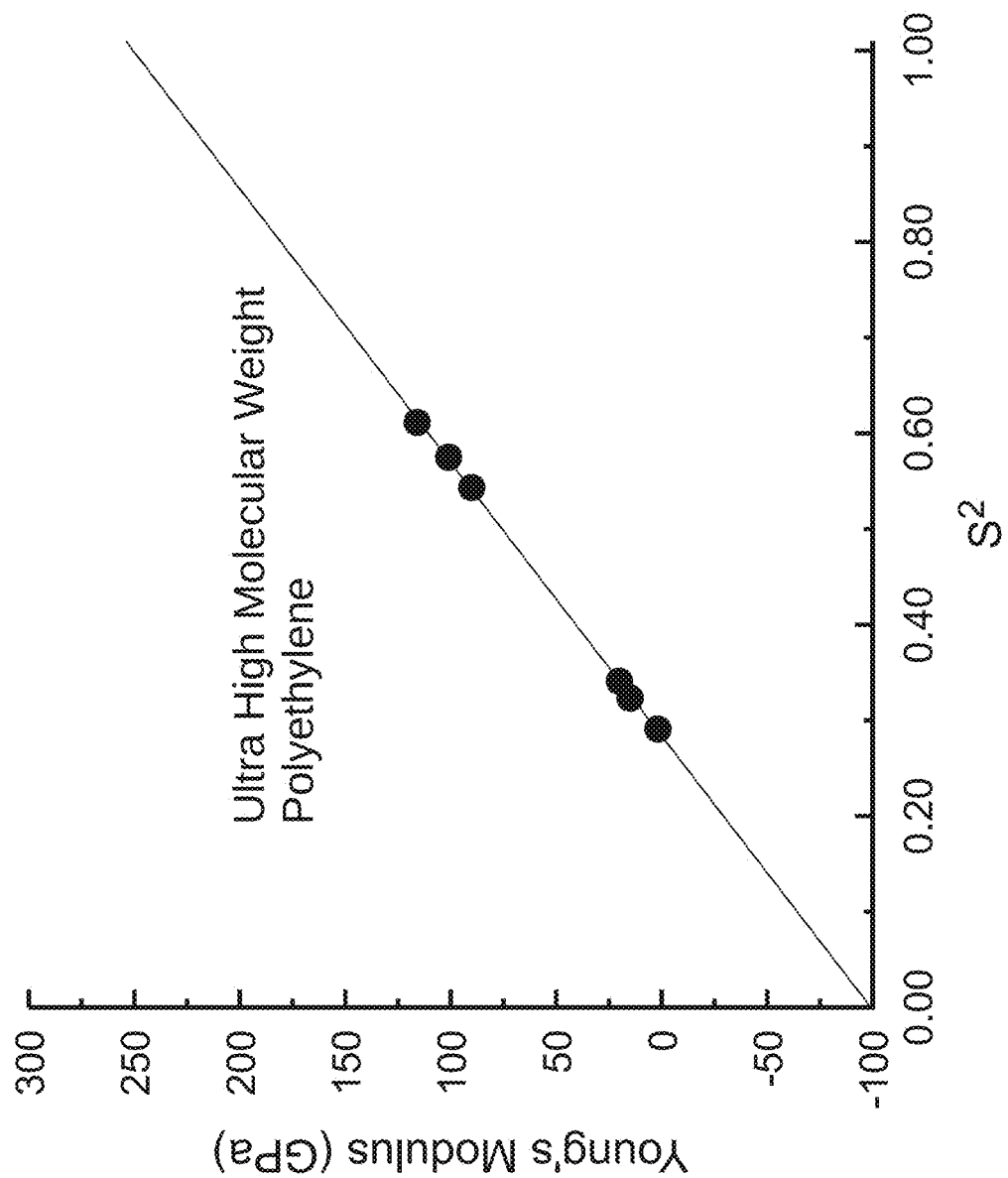
FIG. 10 is a graph showing Young's Modulus as a function of $S^2$ for ultra high molecular weight polyethylene (UHMWPE)
Figure 11:
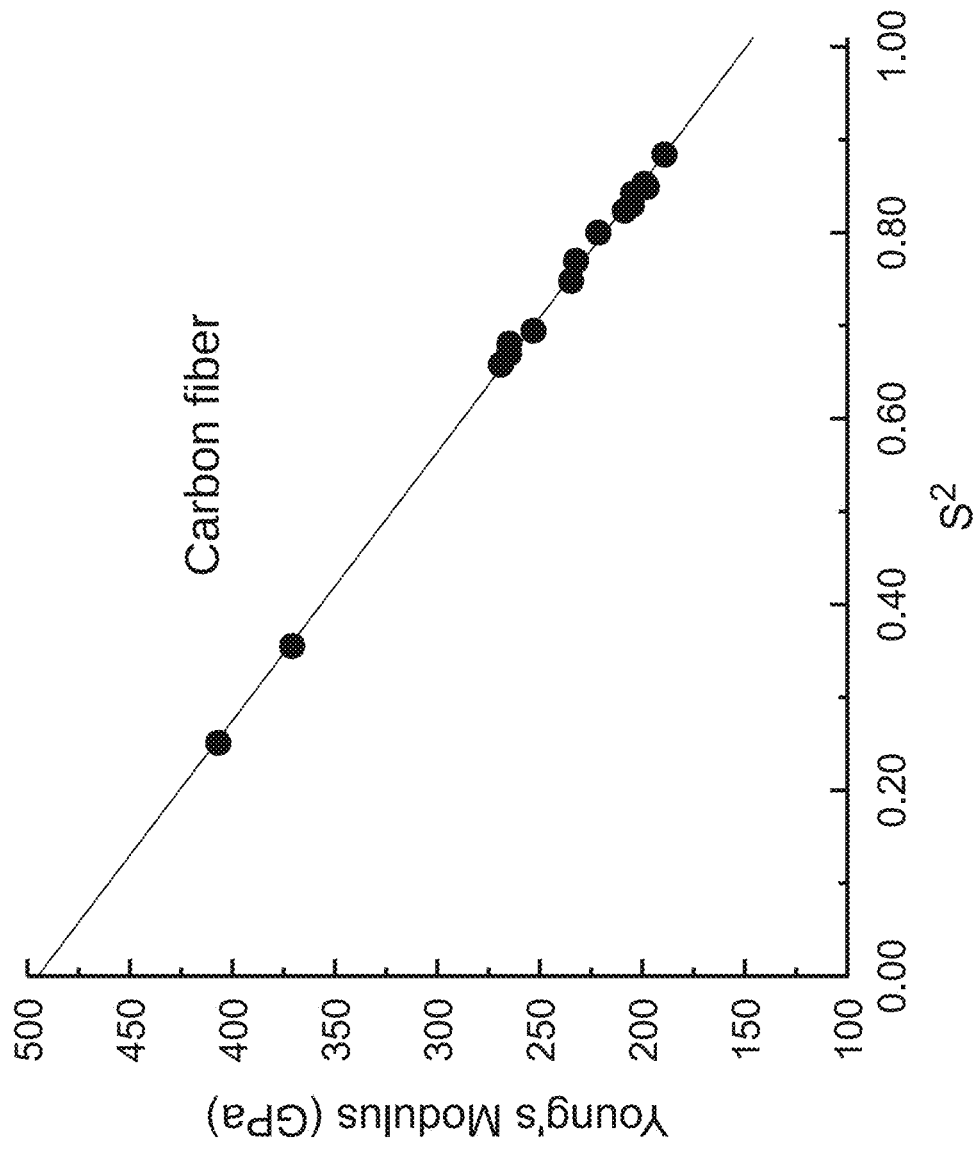
FIG. 11 is a graph showing Young's Modulus as a function of $S^2$ for carbon fiber.

With reference to FIGS. 6 and 7, a mask 40 may comprise an N95 mask having an outer protective layer 41, a central layer 42, and an inner protective layer 43. Protective layers 41 and 43 may comprise cloth or other suitable known materials. The central layer 42 may comprise a non-woven fiber-based filter media or mat having a plurality of polymer fibers 45. The polymer fibers 45 may comprise polypropylene or other polymer as discussed in more detail above. The central layer 42 may be manufactured utilizing known processes. Various production parameters (variables) may be adjusted during production to change or control the properties of the polymer fibers 45 and central layer 42 of mask 40. For example, correlations between various production parameters and resulting $S^2$ values can be determined empirically. Because the correlation between $S^2$ and filtration efficiency can be determined, the $S^2$ value for samples of fibrous filter media such as central layer 42 can be determined, and the production parameters may be adjusted to provide a desired $S^2$ value corresponding to a desired filtration efficiency. In general, the $S^2$ value of a filtration media (e.g., central layer 42) may correspond to various properties of the filtration media, and the $S^2$ value may therefore be determined for filtration media samples, and the production processes may be adjusted as required to provide the desired properties in the filtration media.

The $S^2$ value for various filtration media may also be utilized to select a filtration media for a specific application. For example, various samples of filtration media (e.g., central layer 42 of mask 40) may be ranked according to the $S^2$ value for a sample to determine the predicted filtration efficiency of the various samples. Optionally, additional further testing may be conducted on samples having the highest predicted filtration efficiency to confirm the predicted filtration efficiencies.

The disclosed order-disorder transition in polypropylene is based on temperature-dependent measurements of the Bragg-Williams order parameter S. A model is proposed for the corresponding structural disorder based on the alignment of methyl groups along the polymer chain. Additionally, a system level property of polypropylene—its particle filtering efficiency—follows the predicted spin (Ising) based model equation relating material properties and S2. Although the discussion herein generally focusses on polypropylene fibers, the concepts and processes disclosed herein are not limited to a specific polymer or material, but rather apply broadly to other polymers and fiber systems, including carbon fibers. The concepts and processes disclosed herein may be utilized to quantify and understand the impact of structural disorder at the material level in a broad range of fiber systems, which can be used to evaluate filter designs, mask cleaning strategies, Young's Modulus, and may also form a basis for quality control in manufacturing.

With further reference to FIGS. 8-11, control of order parameter (S) or order parameter squared ($S^2$) may also be used to control Young's Modulus in various materials. In general, various parameters (variables) can be varied/controlled during production of a material to thereby control $S^2$ of the material. The correlation between $S^2$ and Young's Modulus may be used to control (adjust) production variables to provide a material having a specific $S^2$ value, which will provide the desired Young's Modulus.

It will be understood by one having ordinary skill in the art that construction of the described device and other components is not limited to any specific material. Other exemplary embodiments of the device disclosed herein may be formed from a wide variety of materials, unless described otherwise herein.

It is also important to note that the construction and arrangement of the elements of the filtration media and related components as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present disclosure.

It will be understood that any described processes or steps within described processes may be combined with other disclosed processes or steps to form structures (filtration media and the like) within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

The above description is considered that of the illustrated embodiments only. Modifications of the processes, materials, and structures will occur to those skilled in the art and to those who make or use filters and other such items. Therefore, it is understood that the embodiments shown in the drawings and described above are merely for illustrative purposes and not intended to limit the scope of the method and filtration media, which is defined by the following claims as interpreted according to the principles of patent law, including the Doctrine of Equivalents.

What is claimed is:

1. A method of fabricating polymer fiber filter media, comprising:
   determining a relationship between an order parameter squared ($S^2$) of the polymer fiber filter media and a process parameter of a fabrication process used to fabricate the polymer fiber filter media;
   determining a relationship between $S^2$ and values of a selected property of the polymer fiber filter media;
   fabricating an initial polymer fiber filter media sample using an initial value of the process parameter for the fabrication process;
   determining $S^2$ for the initial polymer fiber filter media sample; and
   utilizing the relationship between $S^2$ and the selected property of the polymer fiber filter media to adjust the initial value of the process parameter of the fabrication process to control-the selected property for subsequent polymer fiber filter media made using the adjusted fabrication process parameter, wherein:
   the selected property of the polymer fiber filter media comprises initial particle removal filtering efficiency, and wherein
   the particle filtering efficiency declines as $S^2$ increases.

2. The method of claim 1, wherein:
   the process parameter is adjusted to increase the particle filtering efficiency.

3. The method of claim 1, wherein:
   the initial sample and subsequent polymer fiber filter media comprise at least one polymer selected from the group consisting of polypropylene, polybenzimidazone (PBI), polyester and polypropylene/polyethylene bicomponent spunbond fibers (PP/PE-BCS).

4. The method of claim 1, wherein:
   the initial sample and subsequent polymer fiber filter media comprise a non-woven mat.

5. The method of claim 1, including:
   extracting an order parameter squared ($S^2$) value of the initial fabricated polymer fiber filter media sample from an image of the initial fabricated polymer fiber filter media sample; and
   utilizing the relationship between particle filtering efficiency and $S^2$ to determine an estimated particle filtering efficiency for the initial fabricated polymer fiber filter media sample.

6. The method of claim 5, wherein:
   the image of the initial polymer fiber filter media sample comprises a scanning electron microscope (SEM) image;
   extracting the order parameter squared ($S^2$) value from the image of the initial polymer fiber filter media sample includes:
   1) selecting a region of interest from the image;
   2) fitting two curves to a pixel intensity histogram of the region of interest, the curves corresponding to bright and dark areas of the region of interest; and
   3) determining $S^2$ by calculating a ratio of the area of the bright area to a total area, wherein the total area is the sum of the bright and dark areas.

7. The method of claim 1, including:
   forming a protective mask by positioning the subsequent polymer fiber filter media made using the fabrication process between protective layers of porous material.

8. The method of claim 1, including:
   forming a filter configured for use in at least one of a HVAC system and a powered air filtration unit comprising the subsequent polymer fiber filter media made using the fabrication process.

9. The method of claim 1, wherein:
the relationship between particle filtering efficiency and $S^2$ comprises a linear function.

10. The method of claim 1, wherein:
the particle filtering efficiency comprises an organic particle filtering efficiency.

11. The method of claim 1, wherein:
the initial sample and subsequent polymer fiber filter media comprise polypropylene fibers.

12. The method of claim 1, further comprising:
fabricating a filter using the subsequent polymer fiber filter media, wherein:
the filter comprises a mask or a filter configured to be used in a HVAC system.

13. The method of claim 1, further comprising:
utilizing a second predefined relationship between $S^2$ and a second property of the polymer fiber filter media to adjust the process parameter of the fabrication process to control the second property for subsequent fabricated polymer fiber filter media made using the fabrication process, wherein:
the second property of the polymer fiber filter media comprises Young's Modulus.

14. The method of claim 13, wherein:
the predefined relationship between the order parameter ($S^2$) and the second property of the polymer fiber filter media comprises a linear relationship between the order parameter ($S^2$) and Young's Modulus.

15. The method of claim 1, wherein:
determining $S^2$ for the initial fabricated polymer fiber filter media sample made using the fabrication process further comprises:
obtaining one or more Raman spectra from the initial fabricated polymer fiber filter media sample.

* * * * *